(12) United States Patent
Kim et al.

(10) Patent No.: US 7,639,584 B2
(45) Date of Patent: Dec. 29, 2009

(54) RECORDING MEDIUM, METHOD OF CONFIGURING CONTROL INFORMATION THEREOF, RECORDING AND/OR REPRODUCING METHOD USING THE SAME, AND APPARATUS THEREOF

(75) Inventors: Jin Yong Kim, Seongnam (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 10/881,469

(22) Filed: Jul. 1, 2004

(65) Prior Publication Data
US 2005/0007920 A1 Jan. 13, 2005

(30) Foreign Application Priority Data

| Jul. 7, 2003 | (KR) | ...................... 10-2003-0045824 |
| Jul. 16, 2003 | (KR) | ...................... 10-2003-0048747 |
| Sep. 15, 2003 | (KR) | ...................... 10-2003-0063591 |
| Sep. 22, 2003 | (KR) | ...................... 10-2003-0065628 |

(51) Int. Cl.
G11B 7/0045 (2006.01)

(52) U.S. Cl. ................ 369/59.25; 369/47.38; 369/47.36

(58) Field of Classification Search .............. 369/59.25, 369/189, 47.36, 47.27, 47.38, 47.28
See application file for complete search history.

(56) References Cited

U.S. PATENT DOCUMENTS

| 5,361,173 | A | 11/1994 | Ishii et al. |
| 5,485,469 | A | 1/1996 | Suzuki |
| 5,502,702 | A | 3/1996 | Nakajo |
| 5,590,096 | A | 12/1996 | Ohtsuka et al. |
| 5,636,631 | A | 6/1997 | Waitz et al. |
| 5,764,621 | A | 6/1998 | Choi |
| 5,835,462 | A | * 11/1998 | Mimnagh ................. 369/47.39 |
| 5,914,920 | A | 6/1999 | Yokogawa |
| 6,335,070 | B1 | 1/2002 | Tomita |
| 6,415,435 | B1 | 7/2002 | McIntyre |
| 6,480,450 | B1 | 11/2002 | Fujii et al. |
| 6,487,713 | B1 | 11/2002 | Cohen et al. |
| 6,504,806 | B1 | 1/2003 | Nakajo |
| 6,535,470 | B1 | * 3/2003 | Wu ............................ 369/53.3 |

(Continued)

FOREIGN PATENT DOCUMENTS

AU 2004254437 1/2005

(Continued)

OTHER PUBLICATIONS

Office Action dated Nov. 16, 2006 in corresponding Taiwanese Patent Application No. 093120351 and an English language translation of the same.

(Continued)

*Primary Examiner*—Wayne R Young
*Assistant Examiner*—Thomas D Alunkal
(74) *Attorney, Agent, or Firm*—Harness, Dickey & Pierce

(57) ABSTRACT

A method of recording disc control information in a recordable optical disc including at least one recording layer is provided. Writing speed information and per writing speed write strategy are included in disc control information. The specified disc control information can be uniformly applied to efficiently cope with the record/playback of the optical disc. In configuring disc control information within a management area of an optical disc, the method includes recording a plurality of recording speed informations and a plurality of write strategies respectively associated with corresponding recording speeds within the disc control information wherein one of the recording speed informations is a basic recoding speed information.

35 Claims, 16 Drawing Sheets

U.S. PATENT DOCUMENTS

| | | | |
|---|---|---|---|
| 6,643,233 | B1 | 11/2003 | Yen et al. |
| 6,711,107 | B2 | 3/2004 | Chao et al. |
| 6,868,054 | B1 | 3/2005 | Ko |
| 6,891,786 | B2 | 5/2005 | Sato |
| 6,894,961 | B1 | 5/2005 | Osakabe |
| 6,996,047 | B2 | 2/2006 | Nagano |
| 6,999,393 | B2 | 2/2006 | Yamada |
| 7,012,878 | B2 | 3/2006 | Shinotsuka et al. |
| 7,075,871 | B2 | 7/2006 | Kato et al. |
| 7,088,667 | B2 | 8/2006 | Kobayashi |
| 7,161,881 | B2 | 1/2007 | Pereira |
| 7,170,841 | B2 | 1/2007 | Shoji et al. |
| 7,193,948 | B2 | 3/2007 | Furukawa et al. |
| 7,218,585 | B2 | 5/2007 | Tanii et al. |
| 7,304,938 | B2 | 12/2007 | Hwang et al. |
| 7,345,970 | B2 | 3/2008 | Kim et al. |
| 7,414,936 | B2 | 8/2008 | Tasaka et al. |
| 2001/0044935 | A1 | 11/2001 | Kitayama |
| 2001/0053114 | A1 | 12/2001 | Miyake et al. |
| 2001/0053115 | A1 | 12/2001 | Nobukuni et al. |
| 2002/0021656 | A1 | 2/2002 | Tsukagoshi et al. |
| 2002/0044509 | A1 | 4/2002 | Nakajima |
| 2002/0048241 | A1 | 4/2002 | Kumagai et al. |
| 2002/0048648 | A1 | 4/2002 | Tomura et al. |
| 2002/0085470 | A1 | 7/2002 | Yokoi |
| 2002/0089914 | A1 | 7/2002 | Nakajo |
| 2002/0114234 | A1 | 8/2002 | Chao et al. |
| 2002/0126604 | A1* | 9/2002 | Powelson et al. ........ 369/47.53 |
| 2002/0126611 | A1* | 9/2002 | Chang ..................... 369/59.13 |
| 2002/0159352 | A1 | 10/2002 | Yamada |
| 2002/0167879 | A1 | 11/2002 | Ohno |
| 2002/0167880 | A1 | 11/2002 | Ando et al. |
| 2003/0021201 | A1* | 1/2003 | Kobayashi ............... 369/47.39 |
| 2003/0021202 | A1 | 1/2003 | Usui et al. |
| 2003/0039187 | A1 | 2/2003 | Geutskens |
| 2003/0058771 | A1 | 3/2003 | Furukawa et al. |
| 2003/0072251 | A1 | 4/2003 | Kondo |
| 2003/0076775 | A1 | 4/2003 | Sato et al. |
| 2003/0086345 | A1 | 5/2003 | Ueki |
| 2003/0086346 | A1 | 5/2003 | Fukumoto |
| 2003/0137915 | A1 | 7/2003 | Shoji et al. |
| 2003/0151994 | A1 | 8/2003 | Tasaka et al. |
| 2003/0159135 | A1 | 8/2003 | Hiller et al. |
| 2003/0223339 | A1 | 12/2003 | Taniguchi et al. |
| 2003/0231567 | A1 | 12/2003 | Moritomo |
| 2003/0237024 | A1 | 12/2003 | Ogawa et al. |
| 2004/0001407 | A1 | 1/2004 | Kim et al. |
| 2004/0004921 | A1* | 1/2004 | Lee et al. ................. 369/47.39 |
| 2004/0010745 | A1* | 1/2004 | Lee et al. ..................... 714/769 |
| 2004/0013074 | A1 | 1/2004 | Lee et al. |
| 2004/0022150 | A1* | 2/2004 | Lee et al. ................. 369/47.39 |
| 2004/0030962 | A1 | 2/2004 | Swaine et al. |
| 2004/0062160 | A1 | 4/2004 | Park et al. |
| 2004/0076096 | A1 | 4/2004 | Hwang et al. |
| 2004/0090888 | A1 | 5/2004 | Park et al. |
| 2004/0114474 | A1 | 6/2004 | Park et al. |
| 2004/0125717 | A1 | 7/2004 | Ko et al. |
| 2004/0145980 | A1 | 7/2004 | Park et al. |
| 2004/0223434 | A1* | 11/2004 | Nishimura et al. ....... 369/47.53 |
| 2005/0019023 | A1 | 1/2005 | Ko |
| 2005/0030853 | A1 | 2/2005 | Lee et al. |
| 2005/0030870 | A1 | 2/2005 | Rijpers et al. |
| 2005/0036425 | A1 | 2/2005 | Suh et al. |
| 2005/0038957 | A1 | 2/2005 | Suh |
| 2006/0233059 | A1 | 10/2006 | Suh et al. |
| 2008/0043588 | A1 | 2/2008 | Suh et al. |

FOREIGN PATENT DOCUMENTS

| | | |
|---|---|---|
| CN | 1151071 A | 6/1997 |
| CN | 1400588 | 3/2003 |
| CN | 1416115 | 5/2003 |
| EP | 0 265 984 | 10/1987 |
| EP | 0 522 903 | 7/1993 |
| EP | 1 298 659 | 4/1999 |
| EP | 0 968 769 A2 | 1/2000 |
| EP | 1 128 383 | 8/2001 |
| EP | 1 172 810 A2 | 1/2002 |
| EP | 1 244 097 A1 | 9/2002 |
| EP | 1 308 942 A2 | 5/2003 |
| EP | 1 329 888 A1 | 7/2003 |
| EP | 1 331 631 A1 | 7/2003 |
| EP | 1 361 571 A1 | 11/2003 |
| EP | 1 369 850 A1 | 12/2003 |
| EP | 1 471 506 A1 | 10/2004 |
| EP | 1 522 994 | 4/2005 |
| EP | 1 605 445 A2 | 12/2005 |
| JP | 6-309802 | 11/1994 |
| JP | 9-128899 | 5/1997 |
| JP | 09-134525 | 5/1997 |
| JP | 09-160761 | 6/1997 |
| JP | 9-282661 | 10/1997 |
| JP | 11-085413 | 3/1999 |
| JP | 2000-113458 | 4/2000 |
| JP | 2000-163746 | 6/2000 |
| JP | 2001-052337 | 2/2001 |
| JP | 2002-050053 | 2/2002 |
| JP | 2002-074855 | 3/2002 |
| JP | 2002-230764 | 8/2002 |
| JP | 2002-245625 | 8/2002 |
| JP | 2002-352430 | 12/2002 |
| JP | 2002-352435 | 12/2002 |
| JP | 2003-006860 | 1/2003 |
| JP | 2003-045036 | 2/2003 |
| JP | 2003-178448 | 6/2003 |
| JP | 2003-203341 | 7/2003 |
| JP | 2003-257026 | 9/2003 |
| KR | 2001-0011557 | 2/2001 |
| RU | 2092910 | 10/1997 |
| WO | WO 97/13244 | 4/1997 |
| WO | WO 00/79525 A1 | 12/2000 |
| WO | WO 01/06500 | 1/2001 |
| WO | WO 02/17308 | 2/2002 |
| WO | WO 02/29791 A1 | 4/2002 |
| WO | WO 02/065462 A1 | 8/2002 |
| WO | WO 02/086887 | 10/2002 |
| WO | WO 02/086888 | 10/2002 |
| WO | WO 02/089123 A1 | 11/2002 |
| WO | WO 03/010519 A1 | 2/2003 |
| WO | WO 03/025935 A1 | 3/2003 |
| WO | WO 03/030153 | 4/2003 |
| WO | WO 03/046896 | 6/2003 |
| WO | WO 03/067581 A1 | 8/2003 |
| WO | WO 03/075265 A2 | 9/2003 |
| WO | WO 03/105139 A1 | 12/2003 |
| WO | WO 2004/013845 A1 | 2/2004 |
| WO | WO 2004/015707 | 2/2004 |
| WO | WO 2004/072966 | 8/2004 |
| WO | WO 2005/001819 A1 | 1/2005 |

OTHER PUBLICATIONS

International Search Report issued Sep. 10, 2004 in corresponding International Patent Application No. PCT/KR2004/001574.

Search report issued Oct. 22, 2007 by the European Patent Office in counterpart European Patent Application No. 07016686.3-2210.

Office Action issued Jan. 25, 2008 by the Japanese Patent Office in counterpart Japanese Patent Application No. 2006-523136.

Office Action issued Jan. 29, 2008 by the Indian Patent Office in counterpart Indian Patent Application No. 438/KOLNP/2006.

Search Report for corresponding European application dated Apr. 15, 2008.

Office Action for counterpart Russian patent application No. 2004122413/28(024371) dated Jun. 23, 2008.

Search Report for counterpart European patent application No. 07120273.3-2210/1923870 dated Jul. 2, 2008.
Office Action for Chinese patent application No. 200710127832X dated Dec. 5, 2008.
Office Action for U.S. Appl. No. 10/880,663 dated Feb. 21, 2008.
Office Action for U.S. Appl. No. 10/883,797 dated Mar. 13, 2008.
Office Action for U.S. Appl. No. 12/068,919 dated Sep. 23, 2008.
Office Action for Japanese patent application No. 2006-187883 dated Dec. 26, 2008.
Office Action for Japanese patent application No. 2006-180280 dated Jan. 6, 2009.
Office Action for counterpart U.S. Appl. No. 11/907,658 dated Feb. 25, 2009.
Search Report for counterpart international patent application No. PCT/KR2005/002518 dated Dec. 12, 2005.
Search Report for counterpart European patent application No. 05771159.0 dated Mar. 4, 2009.
Office Action for counterpart U.S. Appl. No. 12/068,919 dated Mar. 5, 2009.
Search Report for counterpart European patent application No. 07007648.4 dated Mar. 11, 2009.
Search Report for counterpart European patent application No. 07017410.7 dated Mar. 27, 2009.
Office Action for Japanese patent application No. 2006-523136 dated Mar. 17, 2009.
Office Action for U.S. Appl. No. 11/907,661 dated Jun. 26, 2009.
Notice of Allowance for Russian patent application No. 2005111867/28 dated May 14, 2009 (in English).
"80 mm (1,23 Gbytes per side) and 120 mm (3,95 Gbytes per side) DVD-Recordable Disk (DVD-R)," ECMA Standardizing Information and Communication Systems, Standard ECMA-279, Dec. 1998.
Notice of Allowance for Russian patent application No. 2006107926 dated Apr. 16, 2009 (with English translation).
Notice of Allowance for Russian patent application No. 2007135325 dated Apr. 13, 2009 (with English translation).
Notice of Allowance for U.S. Appl. No. 10/880,663 dated Jun. 8, 2009.
Office Action for Japanese patent application No. 2007-081296 dated Sep. 1, 2009.
Notice of Allowance for Russian patent application No. 2007135326/28 dated Aug. 24, 2009.
Notice of Allowance for Russian patent application No. 2004122401/28 dated Aug. 12, 2009.
Office Action for Japanese patent application No. 2007-046127 dated Sep. 24, 2009.
Office Action for Japanese patent application No. 2006-523133 dated Sep. 4, 2009.
Office Action for Chinese patent application No. 200710162346.1 dated Sep. 4, 2009.
Office Action for Korean patent application No. 10-2003-0045824 dated Oct. 23, 2009.
Office Action for Chinese patent application No. 200710162347.6 dated Sep. 4, 2009.
Office Action for Malaysian patent application No. PI 20042673 dated Oct. 30, 2009.

* cited by examiner

FIG. 4A

| Byte number | contents | number of bytes |
|---|---|---|
| 0 | Disc Information identifier = "DI" | 2 |
| 5 | DI frame sequence number in DI block | 1 |
| N to N+4 | Recording Velocities for Vnom, Vmin, Vint, Vmax | 5 |
| M to 111 | Write strategy parameters for for Vnom, Vmin, Vint, Vmax | X |

Disc Information (112 bytes)

00h
01h
02h
03h
04h
05h
06h
07h
..

ex. Vnom : 2x (Basic recording speed)
Vmax : 6x
Vmin : Vmax/2.4
Vint : Vmin *1.7

FIG. 4B

| Byte number | contents | Number of bytes |
|---|---|---|
| 0 | Disc Information identifier = "DI" | 2 |
| 5 | DI frame sequence number in DI block | 1 |
| 19 | Recording velocities For Vint | 1 |
| 20 to 23 | Write power settings at Vint (MS 4bytes) | 4 |
| 32 to 35 | Recording velocities For Vnom, Vmax, Vmin | 4 |
| 44 to 47 | Write power settings at Vint (LS 4bytes) | 4 |
| 48 to 71 | Write power settings at Vnom, Vmax, Vmin | 3 * 8 |
| 76 to 84 | dTtop first write pulse start time at Vnom, Vmax, Vmin | 3 * 3 |
| 89 to 97 | dTtop first erase pulse start time at Vnom, Vmax, Vmin | 3 * 3 |
| 99 to 101 | dTtop first write pulse start time at Vint | 3 |
| 102 to 104 | dTtop first erase pulse start time at Vint | 3 |
| 105 to 111 | reserved | |

Disc Information (112 bytes)

| N | 1111 1111b (1~8th Speed applicable) |
|---|---|
| L | 0000 0100b (4 layers) |
| M | 0000 0001b (WS-1) |
| P~111 | WS-1 parameters |

31h

| N | 1111 1111b (1~8th Speed applicable) |
|---|---|
| L | 0000 0100b (4 layers) |
| M | 0000 0010b (WS-2) |
| P~111 | WS-2 parameters |

PIC 1cluster

| Address | Content |
|---|---|
| "00h" | 1st DI (1X, L0) |
| "01h" | 2nd DI (1X, L1) |
| "02h" | 3rd DI (2X, L0) |
| "03h" | 4th DI (2X, L1) |
| "04h" | 5th DI (2X, L0) |
| "05h" | 6th DI (2X, L1) |
| "06h" | 7th DI (2X, L2) |
| "07h" | 8th DI (2X, L3) |
| ... | ... |
| "28h" | 29th DI (16X, L0) |
| "29h" | 30th DI (16X, L1) |
| "30h" | 31th DI (16X, L2) |
| "31h" | 32th DI (16X, L3) |

RECORDING MEDIUM, METHOD OF CONFIGURING CONTROL INFORMATION THEREOF, RECORDING AND/OR REPRODUCING METHOD USING THE SAME, AND APPARATUS THEREOF

This application claims the benefit of the Korean Application No. 10-2003-0045824 filed on Jul. 7, 2003, No. 10-2003-0048747 filed on Jul. 16, 2003, No 10-2003-0063591 filed on Sep. 15, 2003, No. 10-2003-0065628 filed on Sep. 22, 2003 which are hereby incorporated by reference.

BACKGROUND OF THE INVENTION

1. Field of the Invention

The present invention relates to a method of recording control information on a computer-readable recording medium, such as a recordable optical disc having at least one recording layer, and more particularly, to a method in which record velocity information and write strategy parameters are included in the disc control information. Also, this invention relates to a method of recording or reproducing data on or from the recording medium using the writing speed information.

2. Discussion of the Related Art

A high density optical recording medium, known as HD-DVD, is widely used to record and store high-definition video data, large amount program data, and high-quality audio data and so one. The Blu-ray disc represents next-generation HD-DVD technology.

Technological specifications are now being established for the global standardization of the Blu-ray disc, including standards are for the write-once Blu-ray disc (BD-WO). Meanwhile, a rewritable Blu-ray disc, known as the 1×-speed BD-RE and now being discussed, should be compatible with BD-RE discs expected to have higher writing speeds, i.e., the 2×-speed BD-RE and beyond. BD-WO specifications for high recording velocity are also in progress. Efficient solutions for coping with the high writing speed of a high-density optical disc are urgently needed, and the specifications established should ensure mutual compatibility.

SUMMARY OF THE INVENTION

Accordingly, the present invention is directed to an optical disc control information recording method that substantially obviates one or more problems due to limitations and disadvantages of the related art.

An object of the present invention is to provide a method of recording disc control information as specified information corresponding to a plurality of recording velocities, by which recording velocity information is included in the disc control information so that the recording and reproducing of an optical disc can be performed based on prerecorded disc information.

Another object of the present invention is to provide a data structure for configuring disc control information.

Another object of the present invention is to provide a method of recording, in a specific area of an optical disc, disc control information corresponding to a plurality of recording velocities, by which information for specific recording velocities per recording layer is recorded in a specific sequence, to provide mutual compatibility between like-based discs.

Another object of the present invention is to provide a recording and reproducing method and apparatus thereof, by which user data can be recorded on and reproduced from an optical disc using prerecorded disc control information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data structure according to the present invention includes a recording speed information including a first information indicating a maximum recording speed, a second information indicating a minimum recording speed, a third information indicating a predetermined recording speed different from the maximum or minimum recording speed, and a fourth information indicating a basic recording speed.

In another aspect of the present invention, in configuring disc control information within a management area of an optical disc, a method of recording the disc control information of the optical disc includes the step of recording a plurality of recording speed information and a plurality of write strategies respectively associated with corresponding recording speeds within the disc control information wherein one of the recording speed information is a basic recoding speed information.

In another aspect of the present invention, a method of recording data on an optical recording medium includes the step of recording a speed information on a specific area of the optical recording medium, wherein the speed information comprises a first information indicating a maximum recording speed, a second information indicating a minimum recording speed, a third information indicating a predetermined recording speed different from the maximum or minimum recording speed, and a fourth information indicating a basic recording speed.

In another aspect of the present invention, a method of recording/reproducing data on/from an optical recording medium includes the steps of reading a speed information from a specific area of the optical recording medium wherein the speed information comprises a first information indicating a maximum recording speed, a second information indicating a minimum recording speed, a third information indicating a predetermined recording speed different from the maximum or minimum recording speed, and a fourth information indicating a basic recording speed and recording data on a main data area of the optical recording medium based on the read speed information.

In another aspect of the present invention, a recording medium having a recording speed information is characterized in that the recording speed information comprises a first information indicating a maximum recording speed, a second information indicating a minimum recording speed, a third information indicating a predetermined recording speed different from the maximum or minimum recording speed, and a fourth information indicating a basic recording speed.

In another aspect of the present invention, an optical disc includes at least one recording layer provided with a recordable area and a recording-disabled or prerecorded area, wherein disc control information is separately recorded within the prerecorded area per the recording layer and wherein a plurality of recording speed information and a plurality of write strategies associated with corresponding recording speeds are recorded within the disc control information, and wherein one of the recording speed information is a basic recoding speed information.

In another aspect of the present invention, an optical disc recording method includes the steps of if an optical disc having at least one recording layer is loaded, reading disc control information written within a management area of the optical disc and reading to store a plurality of recording speed information and write strategies respectively fitting corresponding recording speeds recorded within a predetermined area of the disc control information each, deciding the recording speed to be applied to each section of the optical disc by referring to a plurality of the stored speed information and the write strategies, and performing a recording at the decided recording speed.

In another aspect of the present invention, an optical disc record playback apparatus includes a control unit delivering a recording command and a record playback unit receiving the recording command, the record playback unit performing a recording in a manner of reading disc control information recorded within a management area of an optical disc, deciding a recording speed for performing the recording command on a specific area by reading a maximum recording speed information, a minimum recording speed information, a basic recording speed information, a predetermined speed information different from the maximum or minimum recording speed information at least, and a write strategy fitting the corresponding recording speed, and performing the recording using the write strategy fitting the decided recording speed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A to 4C are diagrams of disc information recorded according to a first embodiment of the present invention;

FIGS. 7A to 7D are diagrams of recording disc information according to a third embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A Blu-ray disc is taken as an example of an optical disc according to the present invention. Yet, the concept of the present invention, characterized in an optical disc having its disc control information recorded thereon, is applicable to DVD-RAM, DVD-RW, DVD+RW, DVD-R, DVD+R, and similar such discs.

Although the terminology used herein is well known for the most part, some terms have been chosen by the applicant, such that the present invention should be understood with the intended meanings of the terminology as used by the applicant. For example, the "disc control information" of a disc is recorded in a specified area, i.e., a recordable area of the disc or a prerecorded area (sometimes known as an embossed areamanufacturer, in which manufacturer data is recorded and where no further recording is possible), and includes information necessary for the playback of a recorded disc. Disc control information is called "disc information" or "DI" in relation to Blu-ray disc technology but is typically referred to as "physical format information" for DVD-RAM, DVD-RW, DVD+RW, DVD-R, and DVD+R discs. Hence, it should be apparent that the technical background of the present invention is equally applicable to physical format information.

Moreover, the disc information according to the present invention is recorded as an unspecified unit of information, which may be counted, for example, as a first or second information.

Figure 1:
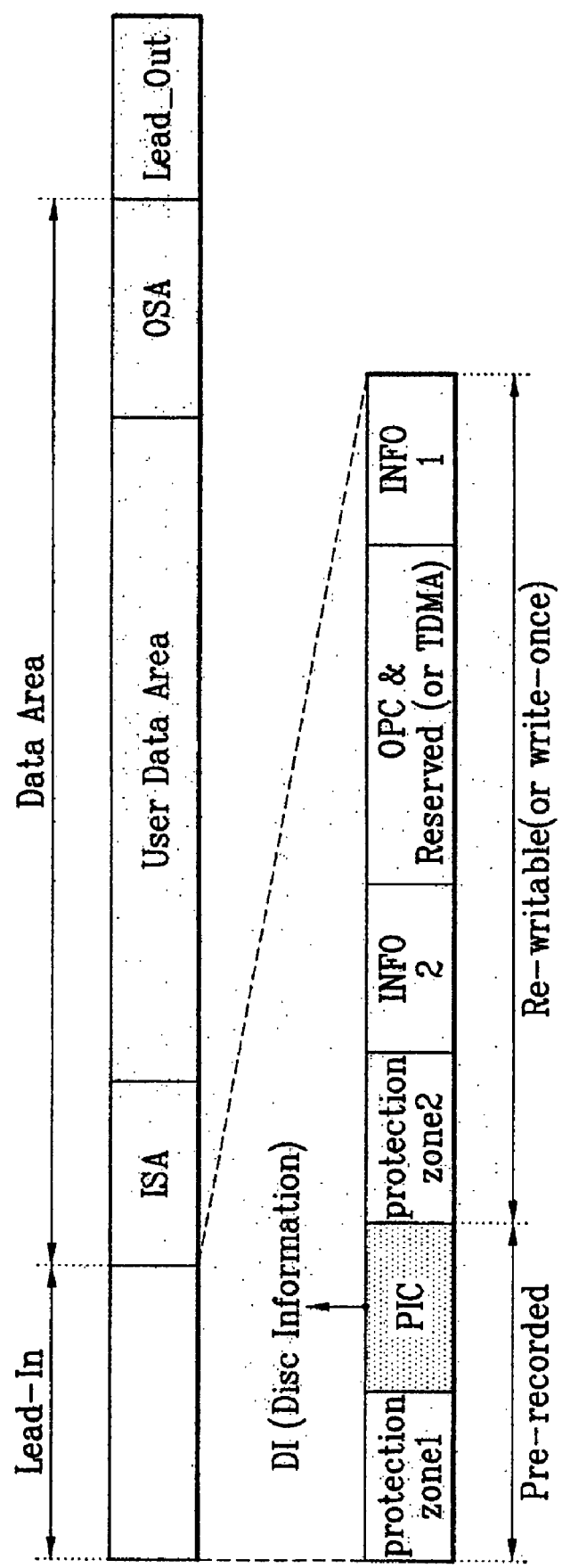
FIG. 1 is a diagram of a single-layer disc applicable to the present invention.
Figure 2:
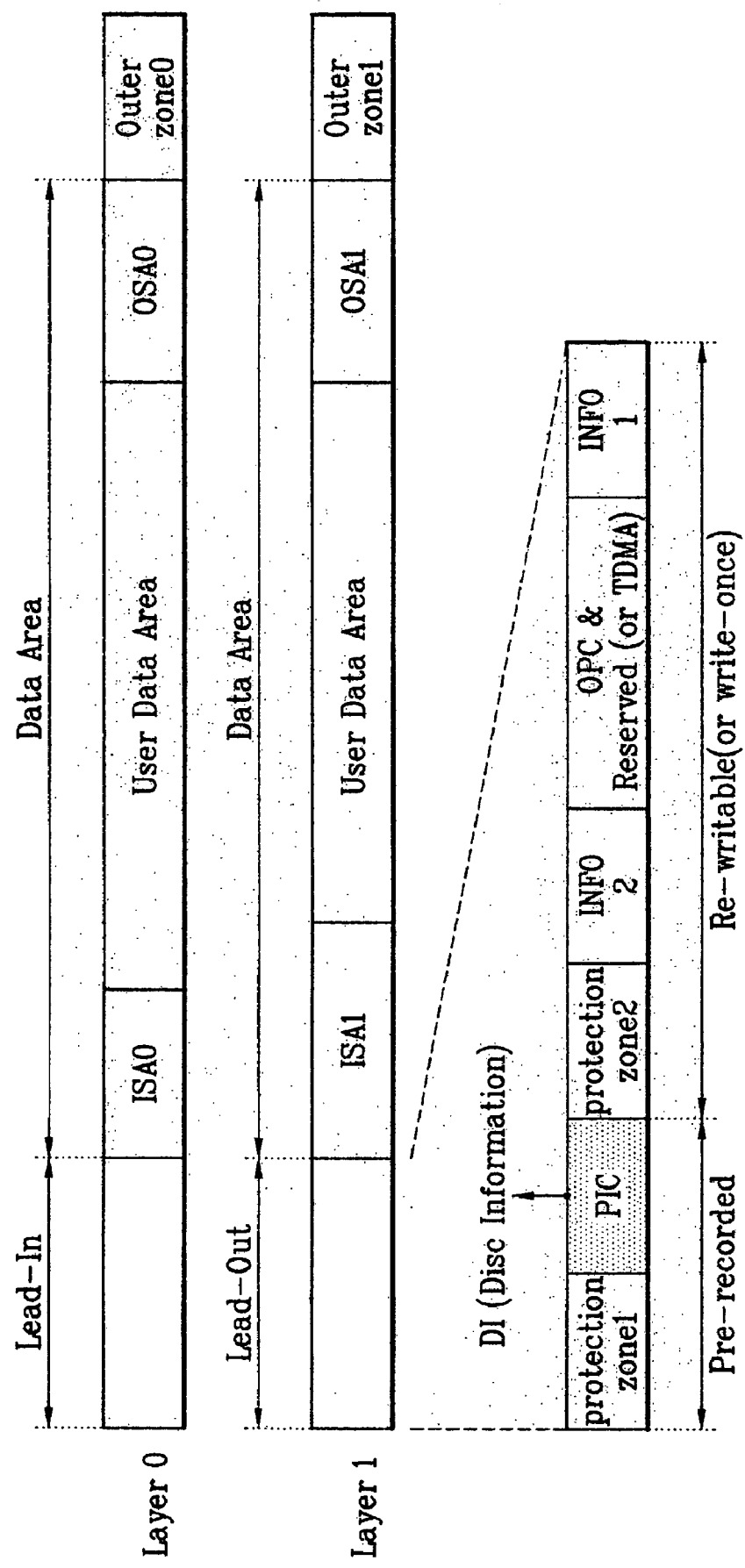
FIG. 2 is a diagram of a dual-layer disc applicable to the present invention.

FIGS. 1 and 2 illustrate the structure of optical discs according to the present invention, in which any recordable optical disc may be applicable to the present invention. The recordable disc may be, for example, a rewritable optical disc or a write-once optical disc.

Referring to FIG. 1, illustrating an optical disc having one recording layer, a lead-in area is provided as a management area on an inner circumference area of an optical disc, whereas a lead-out area is provided as a management area on an outer circumference area of the optical disc. In the inner circumference area, a pre-recorded area and a rewritable (or write-once) area are provided separately. In BD-RE and BD-WO technology, the pre-recorded area is called the PIC area, where permanent information and control data is recorded, and disc information is recorded in the PIC area. A data area is made up of a user data area where user data is recorded and inner and outer spare areas ISA and OSA, which are used in the replacement of the data of a defective area. In the case of a BD-WO disc, a temporary defect management area (TDMA) is provided for recording information of a defect and for general management. The TDMA is unnecessary in the case of BD-RE discs, which have a corresponding area designated as reserved.

The present invention intends to provide a method of recording disc information (DI) as disc control information required for recording and/or reproducing of a disc in a pre-recorded or recordable are. It is apparent that a recording method in the pre-record area is differently applied to each kind of disc. In the case of BD-RE and BD-WO discs, the pre-recorded area is the PIC area recorded using a bi-phased high-frequency modulated signal reproduced according to a specific playback method, to acquire the disc information.

FIG. 2 illustrates an optical disc having dual recording layers, in which an inner circumference area of the disc has a lead-in of a first recording layer (Layer 0) corresponding to a lead-out of a second recording layer (Layer 1). In this case, one PIC area is provided in each of the lead-in and lead-out areas, and the same disc information is recorded in each PIC area.

Figure 3:
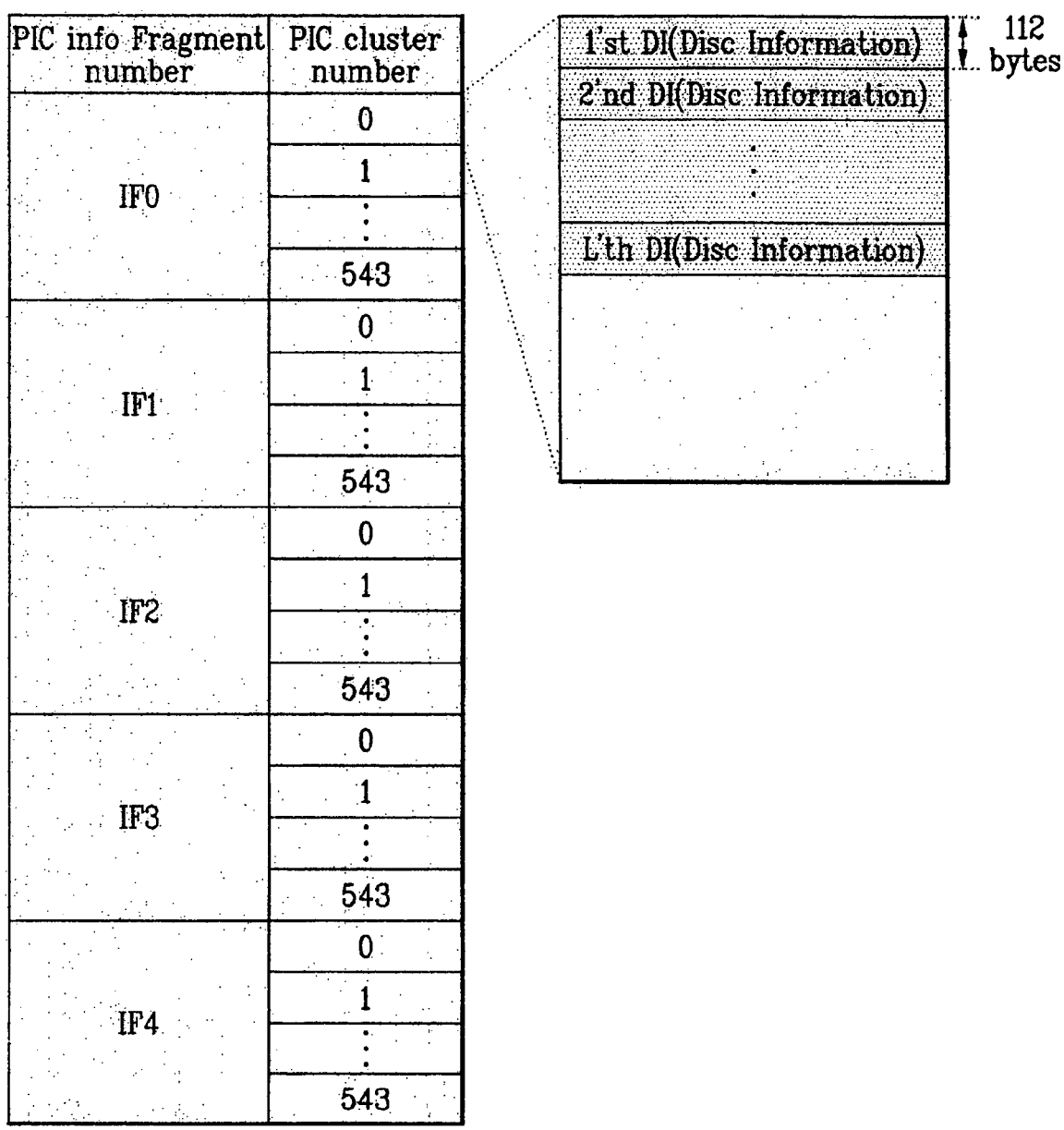
FIG. 3 is a diagram of a management area where disc control information of the present invention is recorded, in which a format of recording the disc information in a corresponding area is schematically shown.

FIG. 3 illustrates a PIC area formatted according to the present invention. In configuring the disc information of the PIC area of a BD-RE or BD-WO disc, the minimum recording unit is one cluster, 544 clusters constitute one fragment as one upper record unit, and five fragments make up the PIC area. Disc information is recorded in a front head cluster of a first fragment IF0. The disc information is plurally recorded per recording layer and recording velocity permitted by the corresponding optical disc. One disc information includes 112 bytes, sometimes referred to as a DI frame. To cope with a loss of disc information, the same contents of the disc information are repeatedly recorded in each front head cluster of the remainder of the fragments.

Information representing the corresponding recording layer, information representing recording velocity, and write strategy information corresponding to the recording velocity are included in each disc information. Such information is utilized in recording and reproducing the optical disc, to provide optimal recording power per recording layer and per recording velocity.

The disc information of the present invention is characterized in providing specific recording velocity information supported by the disc and associated write strategy information, and more specifically, in providing specific recording velocity supported for each recording layer and associated write strategy information via a specified method for discs having a plurality of recording layers.

The specific configuration of the disc information is for a Blu-ray disc, which may differ from the configuration of a DVD-based disc. Specifically, the recording DI volume for a Blu-ray disc is 112 bytes or equivalent. By formulating the disc information of the same recording layer as one information, i.e., without repeating any common information, the write strategy configuration may differ per recording velocity.

In addition to a method of recording specific parameters of the write strategy, a medium property of an optical disc is generally modified by applying a laser beam to a recording layer thereof via a pickup to perform recording. To do so, the laser beam's signal strength (recording power) and duration should be determined. Such information associated with recording is generally referred to as write strategy (WS) parameters for achieving a specific "write strategy."

FIGS. 4A-4C and 5A & 5B illustrate a first embodiment of the present invention of recording disc control information, in which various recording velocities to cope with high speed are grouped into one recording velocity group to be recorded.

The first embodiment of the present invention relates to a recording method of disc information coping with high speed, a method of recording data on an optical disc, and the like, and more particularly, to an advantageous method in coping with a constant angular velocity (CAV) system applicable to a high-speed disc. The present invention is not limited, however, to a CAV system.

In the CAV system, a disc is rotated at a constant speed such that the disc's inner and outer circumferences each have a rotational velocity corresponding to the length of the applied radius. For a Blu-ray disc, the velocity of the outer circumference is about 2.4 times greater than that of the inner circumference. Accordingly, if, for example, the recording on the inner circumference using a CAV system is performed at 1×-speed or 4×-speed, the outer circumference recording has to be performed at about 2.4×-speed or 9.6×-speed, respectively, and conversely, a 6×-speed recording on the outer circumference means that the inner circumference recording has to be performed at about 2.5×-speed. In other words, adoption of the CAV system requires a velocity differential between the disc's inner and outer circumferences, so that an optimal recording velocity and write strategy must be selected for recording according to the applicable disc location. Moreover, such information should be provided as specified disc information to utilize the optimal recording velocity and write strategy (WS) in a corresponding system.

FIG. 4A shows one embodiment of recording disc information by an optical disc control according to the present invention, in which a disc information structure is schematically illustrated.

Referring to FIG. 4A, each disc information sequence is determined by a sequence number and is recorded using one byte. For instance, the information is recorded in a fifth byte (i.e., the "DI frame sequence number in DI block," which can be represented as 00h, 01h, 02h, 03h, 04h, 05h, 06h, or 07h) of the disc information, where a fifth byte of 00h or 07h indicates a first or eighth disc information, respectively. In another meaning, the byte (e.g., $5^{th}$ byte) deciding the sequence of the disc information can be defined to mean not only the sequence but also an applicable recording velocity in a specific recording layer. For instance, '00h' means 1× speed disc information of a first recording layer, '01h' means 1× speed disc information of a second recording layer, and the like.

Moreover, in a specific area within the disc information, recording velocity information designated by the corresponding disc information and write strategy (WS) coping with the corresponding recording velocity are written in a previously promised specific location. For instance, the recording velocity information of the corresponding disc information is written in $N^{th}$~$(N+4)^{th}$ bytes and the write strategy (WS) coping with the corresponding recording velocity is written in $M^{th}$~$111^{th}$ bytes.

Specifically, the present invention is characterized in providing disc information coping with high recording velocity, the recording velocity information and write strategy (WS) are written for each of a plurality of recording velocity information, namely, an optimal recording velocity Vnom, a maximum recording velocity Vmax, a minimum recording velocity Vmin, and an intermediate recording velocity Vint.

At optimal recording velocity, the basic recording speed information is written, and a basic recording speed generally starts at 2×-speed in a high-speed disc. As an applicable recording speed increases, so does the basic recording speed.

At maximum recording velocity, information associated with maximum recording velocity applicable by a corresponding disc is written. At minimum recording velocity, information associated with recording speed found by dividing the maximum recording velocity applicable by the corresponding disc by '2.4' is written. At intermediate recording velocity, information associated with recording speed found by multiplying the minimum recording velocity by '1.7' is written.

A relation of determining recording velocity values of the maximum, minimum, and intermediate recording velocities is decided for convenience of explanation by considering a radius ratio between inner and outer circumferences of BD applicable to the present invention. It is apparent that such a relation can be variably applied to other kinds of discs and that the recording velocity values can be set to different values according to disc characteristics despite the same BD.

Relating to the optimal recording velocity (2× speed), the same information is preferably recorded in each disc information. Preferably, the maximum, minimum, and intermediate recording velocities are differently determined according to the maximum recording velocity value applicable by the corresponding disc information.

Moreover, it is able to set up the intermediate recording velocities plurally. The present invention is characterized in having at least one intermediate recording velocity. Hence, at least four recording velocity information are included in one disc information. The more the recording velocity information exist, the more advantageous it becomes for the system operation. Hence, by utilizing a recordable area within disc information to the maximum, many intermediate recording velocity information are preferably provided thereto.

FIG. 4B shows a specific recording method for disc information having a plurality of per recording velocity information according to the present invention like FIG. 4A, in which disc information is written while maintaining compatibility with 1×-speed BD-RE disc information under discussion and in which there exists one intermediate recording velocity information for example.

Three kinds of recording velocities such as optimal recording velocity (Vnom), maximum recording velocity (Vmax), and minimum recording velocity (Vmin) are written in $32^{nd} \sim 35^{th}$ bytes within disc information according to a predetermined definition. Write power information as write strategy (WS) for each of the three kinds of recording velocities is recorded in $48^{th} \sim 71^{st}$ bytes. A start time of a write pulse as another write strategy (WS) coping with each of the three kinds of recording velocities is recorded in $76^{th} \sim 84^{th}$ bytes. A start time of an erase pulse as another write strategy (WS) coping with each of the three kinds of recording velocities is recorded in $89^{th} \sim 97^{th}$ bytes.

In addition to the basic three kinds of recording velocities Vnom, Vmax, and Vmin, the present invention further records at least one information associated with the intermediate recording velocity Vint, which is recorded using a reserved area within disc information. For instance, the intermediate recording velocity is recorded in $19^{th}$ byte according to a predetermined definition, write power information is recorded as write strategy (WS) coping with the intermediate recording velocity in total 8-bytes of $20^{th} \sim 23^{rd}$ bytes and $44^{th} \sim 47$th bytes, a start time of a write pulse as another write strategy (WS) coping with the intermediate recording velocity is recorded in $99^{th} \sim 101^{st}$ bytes, and a start time of an erase pulse as another write strategy (WS) coping with the intermediate recording velocity is recorded in $102^{nd} \sim 104^{th}$ bytes.

As explained in the foregoing description, if a plurality of intermediate recording velocities are intended to be recorded, information associated with another intermediate recording velocity can be recorded in a reserved area within disc information as well.

Figure 4C:
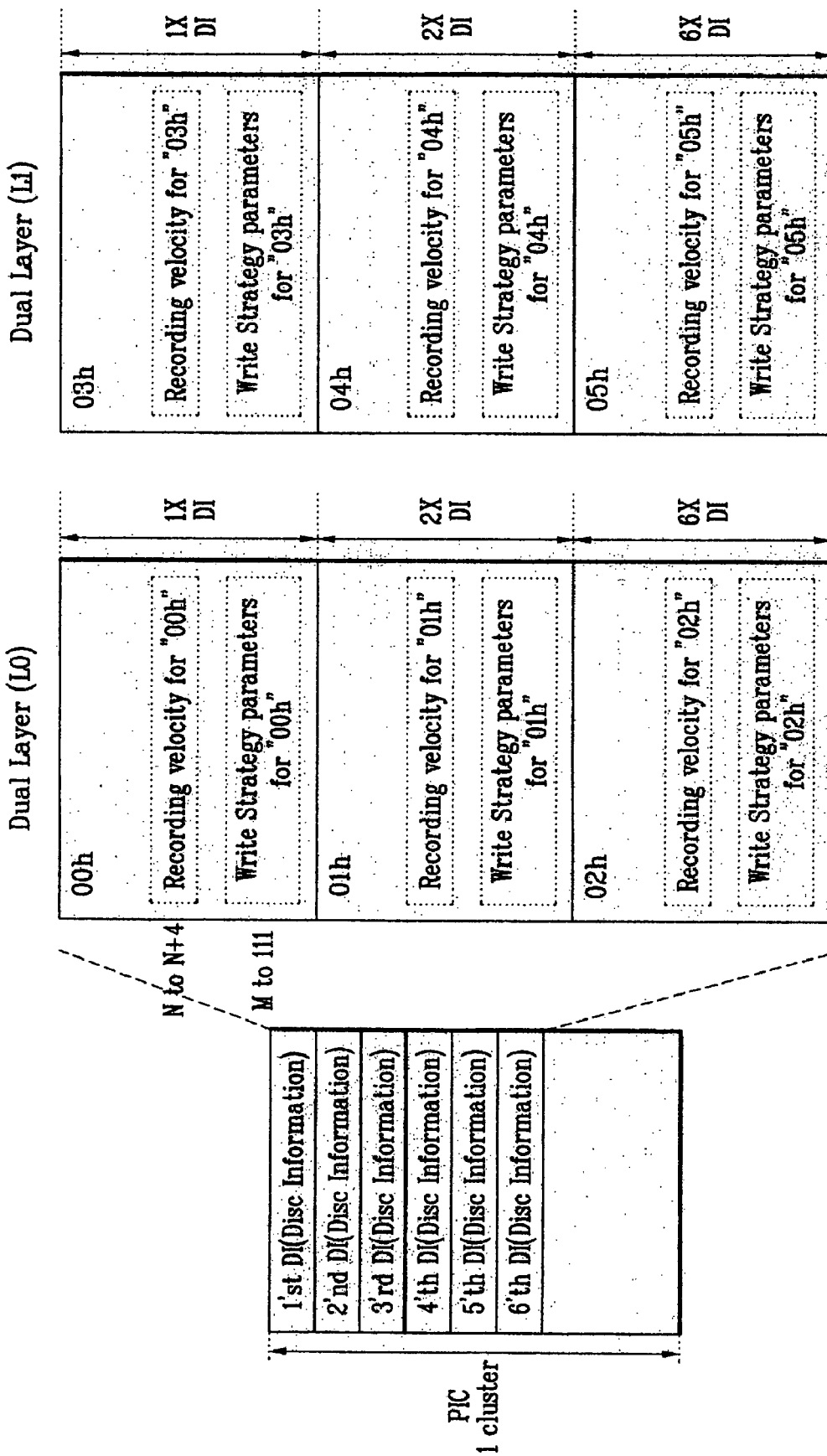

FIG. 4C schematically shows disc information recorded in case of recording the disc information of FIG. 4A, and more particularly, in case of a dual layer having two recording layers. The same principle can be applied to a single layer having one recording layer.

For instance, when an optical disc needs three different recording velocity information per recording layer, six disc information corresponding to each recording velocity are required. Each disc information allocates to record a sequence number, recording velocity information corresponding to the sequence number, and a write strategy (WS) in a predetermined area.

For instance, if recording velocities to be represented are 1×-speed, 2×-speed, and 6×-speed, first, second, and third disc information mean the disc information for the first recording layer. The $1^{st}$ disc information is 1×-speed disc information of the $1^{st}$ recording layer and has a sequence number of '00h'. The corresponding recording velocity and write strategy are recorded in a previously promised location, whereby the recording velocity information is recorded in $N^{th} \sim (N+4)^{th}$ bytes and the write strategy is recorded in $M^{th} \sim 111^{th}$ bytes.

The $2^{nd}$ disc information is 2×speed disc information of the $1^{st}$ recording layer and has a sequence number of '01h'. The corresponding recording velocity and write strategy are recorded in a previously promised location like the $1^{st}$ disc information. The third disc information is 6× speed disc information of the $1^{st}$ recording layer and has a sequence number of '02h'. The corresponding recording velocity and write strategy are recorded in a previously promised location like the $1^{st}$ or $2^{nd}$ disc information.

Meanwhile, $4^{th}$ to $6^{th}$ disc information mean disc information for $2^{nd}$ recording layer. The $4^{th}$ disc information is 1× speed disc information of the $2^{nd}$ recording layer and has a sequence number of '03h'. The $5^{th}$ disc information is 2× speed disc information of the $2^{nd}$ recording layer and has a sequence number of '04h'. The $6^{th}$ disc information is 6× speed disc information of the $2^{nd}$ recording layer and has a sequence number of '05h'. The corresponding recording velocity and write strategy of each of the $4^{th}$ to $6^{th}$ disc information are recorded in the same location.

The first embodiment of the present invention shown in FIGS. 4A to 4C is described by taking an example of recording a plurality of the recording velocity information and per recording velocity write strategies (WS) within one disc information. If necessary, one write strategy (WS), associated with specific recording velocity information, may be recorded in one disc information, and the remainder recorded in another disc information.

For instance, in case that four kinds of recording velocity information are required, the disc information are needed four times more than those of the above-described embodiment of the present invention. Yet, the PIC area, as shown in FIG. 3, is an area sufficient for recording a multitude of 112-bytes disc information therein so that sufficiently large amount of disc information can be recorded therein if necessary. Hence, if one write strategy (WS) is recorded within the disc information, it is advantageous in allocating more areas for recording intermediate recording velocity therein.

On the contrary, it is possible to record information commonly recorded in each disc information as common information once and to change to record the per recording velocity write strategies only.

Figure 5A:
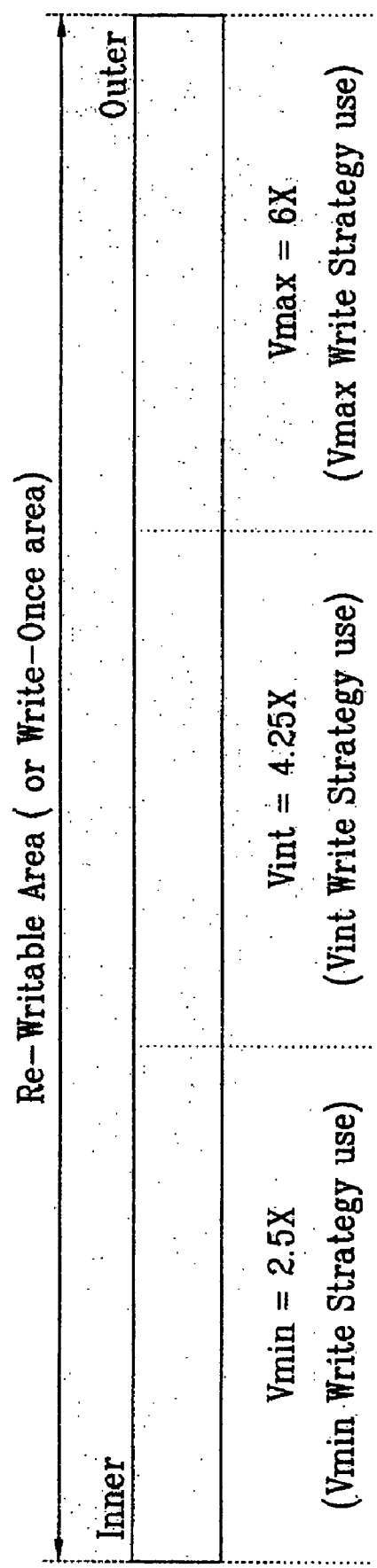
FIGS. 5A and 5B are diagrams of a disc recording method according to the first embodiment of the present invention.
Figure 5B:
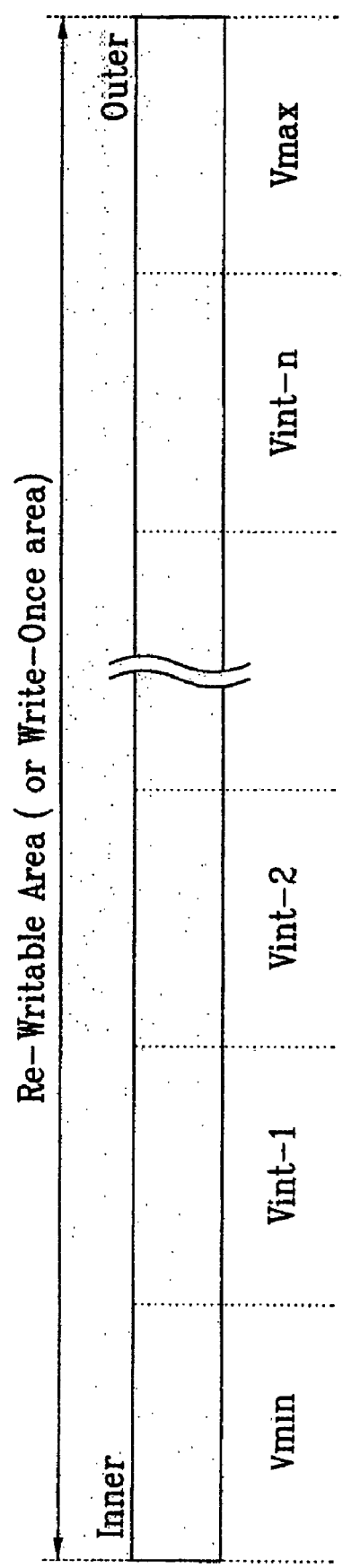

FIG. 5A and FIG. 5B are diagrams of a recording method of performing a recording on an optical disc according to the first embodiment of the present invention. FIG. 5A relates to a case of using one intermediate recording velocity, and FIG. 5B shows an example of using at least two intermediate recording velocities.

Namely, once an optical disc is loaded in an optical record/playback unit, write strategies respectively associated with maximum recording velocity (Vmax), minimum recording velocity (Vmin), and intermediate recording velocity (Vint) are read out as disc control information within the optical disc.

A recordable area between an inner circumference and an outer circumference is virtually divided into three sections. The maximum recording velocity (Vmax), minimum recording velocity (Vmin), and intermediate recording velocity (Vint) are applied to an outer circumference area, an intermediate area, and an inner circumference area, respectively, to perform a recording thereon. This means that the recording is performed by applying an appropriate recording velocity and write strategy (WS) associated with the corresponding recording velocity to a specific area, where the recording will be performed, to adjust write power, write pulse timing, and the like.

For instance, if a maximum recording velocity applicable by a disc is 6×-speed, disc information associated with 6× speed is read out. In case that the maximum recording velocity (Vmax) is 6×-speed, 2.5×-speed for a minimum recording velocity (Vmax/2.4) and 4.25× speed for an intermediate recording velocity (1.7 Vmin) are recorded within the disc information as well as write strategies for the respective recording velocities. A record/playback unit previously confirms the recording velocity and write strategy (WS), which will be applied to a specific area where a recording will be performed, thereby enabling to quickly cope with the write strategy (WS) in performing the recording on the corresponding area and to reduce probability of error occurrence using the optimal recording velocity.

FIG. 5B schematically shows a method of performing a recording on an optical disc in case that a plurality of intermediate recording velocities are recorded within disc information. A recordable area of an optical disc is virtually divided into a plurality of sections as many as a number of recording velocities within disc information except Vnom. Maximum recording velocity (Vmax) and minimum recording velocity (Vmin) are applied to an outer circumference area and an inner circumference area, respectively, to perform a recording thereon. An intermediate area of the disc is divided into areas as many as the number of the set intermediate recording velocities to apply the intermediate recording velocities Vint-1~Vint-n thereto, respectively. Thus, the corresponding recording is performed on the divided areas. Hence, an optimal recording velocity to the corresponding section is determined, whereby the recording is enabled using the determined write strategy (WS) per the corresponding decided recording velocity.

Figure 6A:
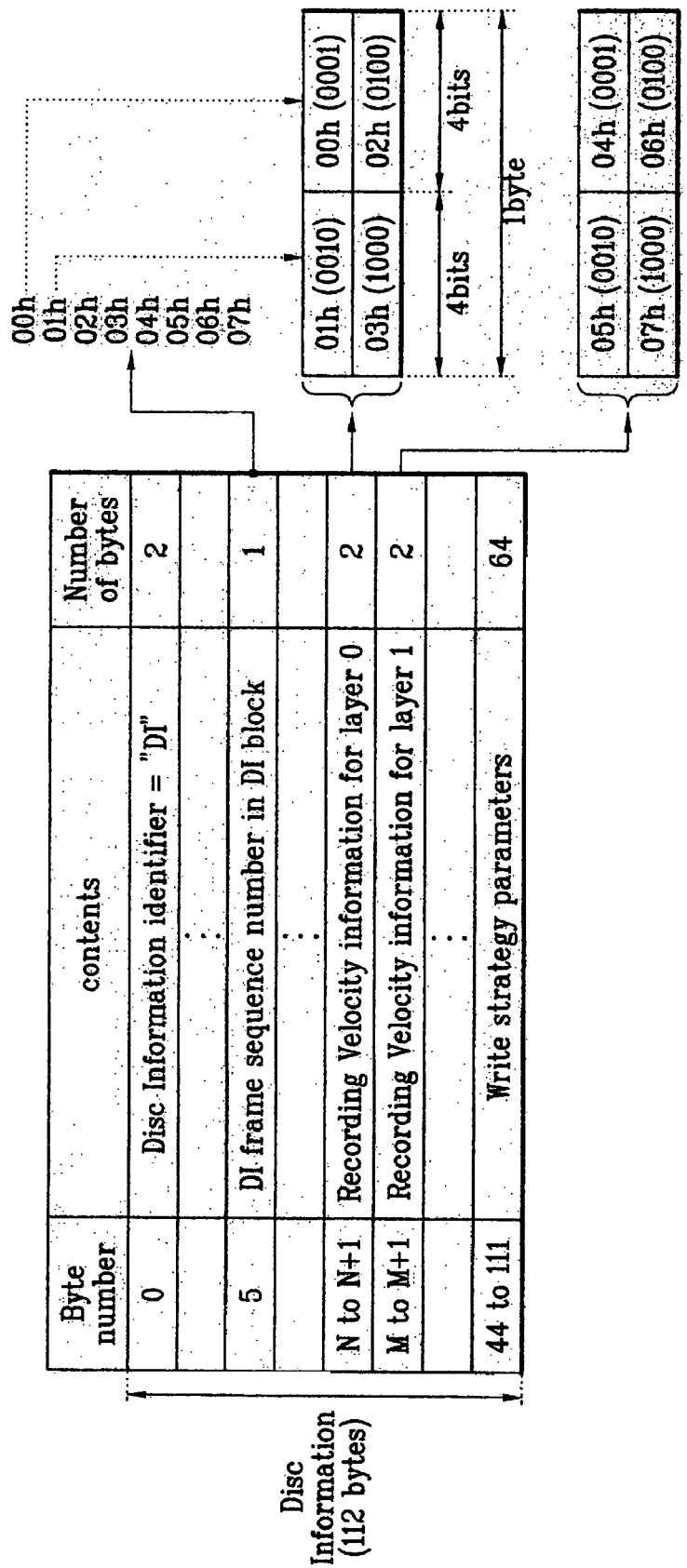
FIGS. 6A to 6C are diagrams of recording disc information according to a second embodiment of the present invention.
Figure 6B:
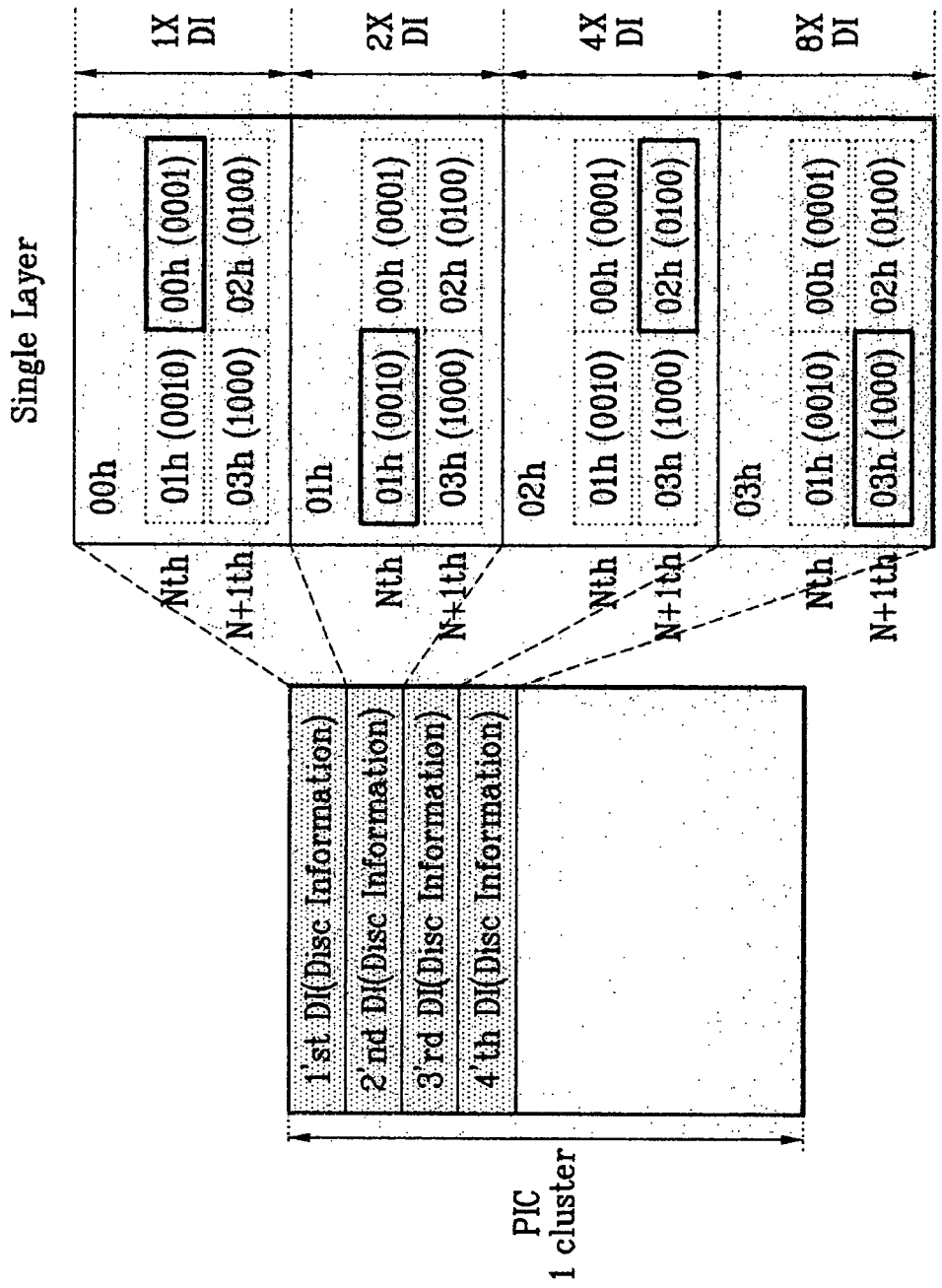
Figure 6C:
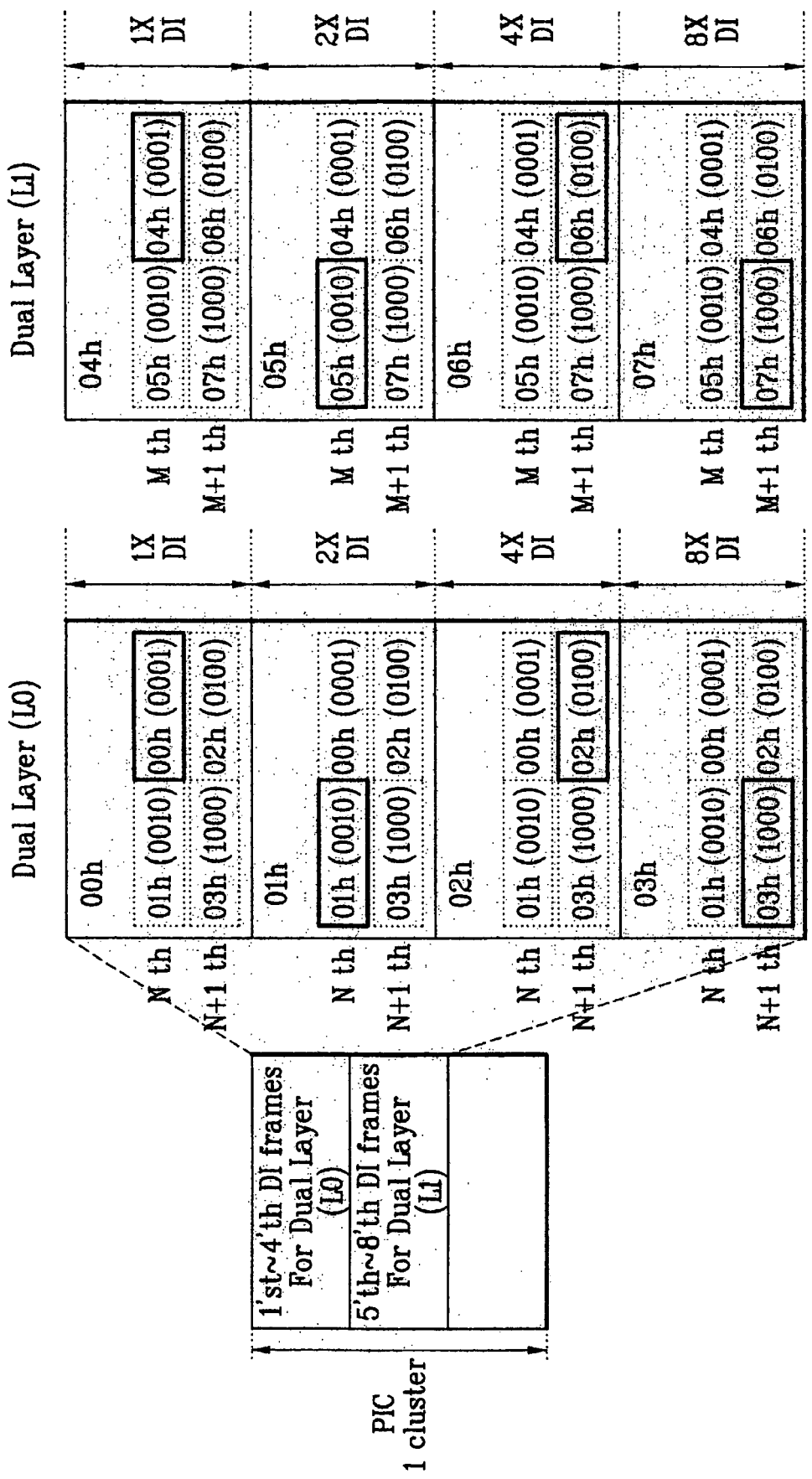

FIGS. 6A to 6C illustrate a second embodiment of the present invention of recording disc control information, in which recording velocity information indicating a corresponding recording velocity and a write strategy corresponding to the recording velocity are recorded within each disc information to cope with high speed.

FIG. 6A shows one example of recording disc information of an optical disc according to a third embodiment of the present invention, in which a disc information structure is schematically illustrated.

Referring to FIG. 6A, a sequence of each disc information is decided by a sequence number, and the corresponding sequence is written by 1-byte. For instance, the corresponding information is recorded in $5^{th}$ byte within the disc information, which is named 'DI frame sequence number in DI block' field and is briefly represented by '00h, 01h, 02h, . . . '. Namely, the information of the $5^{th}$ byte is defined in a following manner. First of all, if the information of the $5^{th}$ byte is '00h', '00h' means $1^{st}$ disc information. '07h' means $8^{th}$ disc information.

In a specific area within the disc information, each recording velocity information allowed by a disc is represented by a specific bit to be recorded in a previously promised specific location within the disc information. For instance, if a corresponding disc needs four different recording velocity information per recording layer, 4-bits are allocated to one recording velocity each, recording velocity information for the first recording layer (Layer 0) is recorded in $N^{th}$ and (N+1)th bytes within the disc information, and recording velocity information for $2^{nd}$ recording layer Layer 1 is recorded in $M^{th}$ and (M+1)$^{th}$ bytes within the disc information. If the disc has a single layer, the $M^{th}$ and (M+1) th bytes are set to 'zero' value.

If at least four kinds of different recording velocity information are required, bytes such as $N^{th}$ byte, (N+1)$^{th}$ byte, (N+2)$^{th}$ byte, and the like are additionally allocated to use.

Therefore, the recording velocity corresponding to its sequence number, as shown in FIG. 6A, is recorded in a previously promised specific location, whereby it is facilitated to confirm the recording velocity information possessed by the corresponding disc information. Moreover, the remaining bytes, e.g., $44^{th}$~$111^{th}$ bytes, are utilized to record write power, write parameters, and the like in detail.

FIG. 6B schematically shows disc information recorded in case of representing the recording velocity information like FIG. 6A, and more particularly, in case of a single layer. If an optical disc requires four kinds of different recording velocity information, four disc information corresponding to each recording velocity are needed. Each of the disc information is recorded by allocating 4-bits to a sequence number and 4-bits to recording velocity corresponding to the sequence number.

For instance, if recording velocities to be represented are 1× speed, 2× speed, 4× speed, and 8× speed, respectively, $1^{st}$ disc information has a sequence number corresponding to '00h' to represent a corresponding recording velocity by '0001b' indicating 1× speed, $2^{nd}$ disc information has a sequence number corresponding to '01h' to represent a corresponding recording velocity by '0010b' indicating 2× speed, $3^{rd}$ disc information has a sequence number corresponding to '02h' to represent a corresponding recording velocity by '0100b' indicating 4× speed, and $4^{th}$ disc information has a sequence number corresponding to '03h' to represent a corresponding recording velocity by '1000b' indicating 8× speed. In doing so, each recording velocity is represented by binary information. Hence, if 4-bits each is allocated, a maximum applicable recording velocity (represented by '1111b') will be 15× speed. If the maximum applicable recording velocity exceeds 16× speed, at least 5-bits each should be allocated.

Since the single layer is shown in FIG. 6B, $M^{th}$ and (M+1)$^{th}$ bytes representing recording velocity information for $2^{nd}$ recording layer Layer 1 are set to 'zero' to be handled as unused information.

FIG. 6C schematically shows disc information recorded in case of representing the recording velocity information like FIG. 6A, and more particularly, in case of a dual layer. If an optical disc requires four kinds of different recording velocity information, total eight disc information corresponding to each recording velocity are needed. Each of the disc information is recorded by allocating 4-bits to a sequence number and 4-bits to recording velocity corresponding to the sequence number.

For instance, if recording velocities to be represented are 1× speed, 2× speed, 4× speed, and 8× speed, respectively, $1^{st}$ disc information has a sequence number corresponding to '00h' to represent a corresponding recording velocity by '0001b' indicating 1× speed, $2^{nd}$ disc information has a sequence number corresponding to '01h' to represent a corresponding recording velocity by '0010b' indicating 2× speed, $3^{rd}$ disc information has a sequence number corresponding to '02h' to represent a corresponding recording velocity by '001b' indicating 4× speed, and $4^{th}$ disc information has a sequence number corresponding to '03h' to represent a corresponding recording velocity by '1000b' indicating 8× speed. The $1^{st}$ to $4^{th}$ disc information are information for the $1^{st}$ recording layer (Layer 0) and are recorded in $N^{th}$ and (N+1)$^{th}$ bytes of disc information, and 4-bits represent each recording velocity by binary information.

Likewise, recording velocity information can be represented for $2^{nd}$ recording layer in the same manner, which is recorded in $M^{th}$ and $(M+1)^{th}$ bytes. Namely, $5^{th}$ disc information has a sequence number corresponding to '04h' to represent a corresponding recording velocity by '0001b' indicating 1× speed, $6^{th}$ disc information has a sequence number corresponding to '05h' to represent a corresponding recording velocity by '0010b' indicating 2× speed, $7^{th}$ disc information has a sequence number corresponding to '06h' to represent a corresponding recording velocity by '0100b' indicating 4× speed, and $8^{th}$ disc information has a sequence number corresponding to '07h' to represent a corresponding recording velocity by '1000b' indicating 8× speed.

In the second embodiment, write strategy for write power, write parameters, and the like fitting each recording velocity is recorded in a rest area within the disc information as well as the recording velocity information. Hence, within one disc information, a sequence number of the corresponding disc information, recording velocity information represented by the corresponding disc information, write strategy (WS) coping with the corresponding recording velocity, and the like are recorded respectively.

Besides, in representing the recording velocity information like the second embodiment, $5^{th}$ byte information is previously defined as a specific recording velocity so that recording velocity information is recorded in $N^{th}$, $(N+1)^{th}$, $M^{th}$, and $(M+1)^{th}$ bytes to confirm it.

For instance, it is previously defined that '00h' of $5^{th}$ byte information means '1× speed disc information of $1^{st}$ recording layer' and that '07h' of $5^{th}$ byte information means '8× speed disc information of $2^{nd}$ recording layer'. Four bits are allocated to each of the $N^{th}$, $(N+1)^{th}$, $M^{th}$, and $(M+1)^{th}$ bytes so that an accurate recording velocity value is recorded as '0001b' (1× speed) or '0100b' (8× speed). Thus, it is reconfirmed that the corresponding disc information is 1×- or 8×-speed.

FIGS. 7A to 7D are diagrams of recording disc information according to a third embodiment of the present invention, in which applicable recording speed information is recorded to cope with high speed.

In order to acquire disc information associated with a specific writing speed of an intended specific recording layer from a plurality of existing disc information, the entire disc information should be read to take a lot of time. For instance, if there are four recording layers and eight writing speed applicable per recording layer, total thirty-two disc information are needed. A record/playback unit should search the entire disc information amounting to thirty-two whenever a value of the disc information for the specific recording layer and writing speed is needed. Hence, the present invention is characterized in recording 'disc-applicable writing speed information' and 'recording layer information existing in a disc' within disc information to enable a disc information search by a specified method using the recorded information.

Namely, the 'disc-applicable writing speed information' and 'recording layer information existing in a disc' are identically recorded within each disc information in common and a sequence of a plurality of disc information is decided using these information, thereby facilitating to acquire disc information related to the specific recording layer and writing speed to be searched.

Moreover, one write strategy (WS) is recorded within each disc information and identification information for identifying a kind or type of the corresponding write strategy (WS) is separately recorded, whereby a record playback apparatus (FIG. 8) is facilitated to use the write strategy (WS). Moreover, by selecting to record one write strategy (WS) for a specific writing speed and a specific recording layer in disc information, a disc manufacturer can be provided with convenience.

A method of recording disc information according to a third embodiment of the present invention is explained by referring to FIGS. 7A to 7D as follows.

Figure 7A:
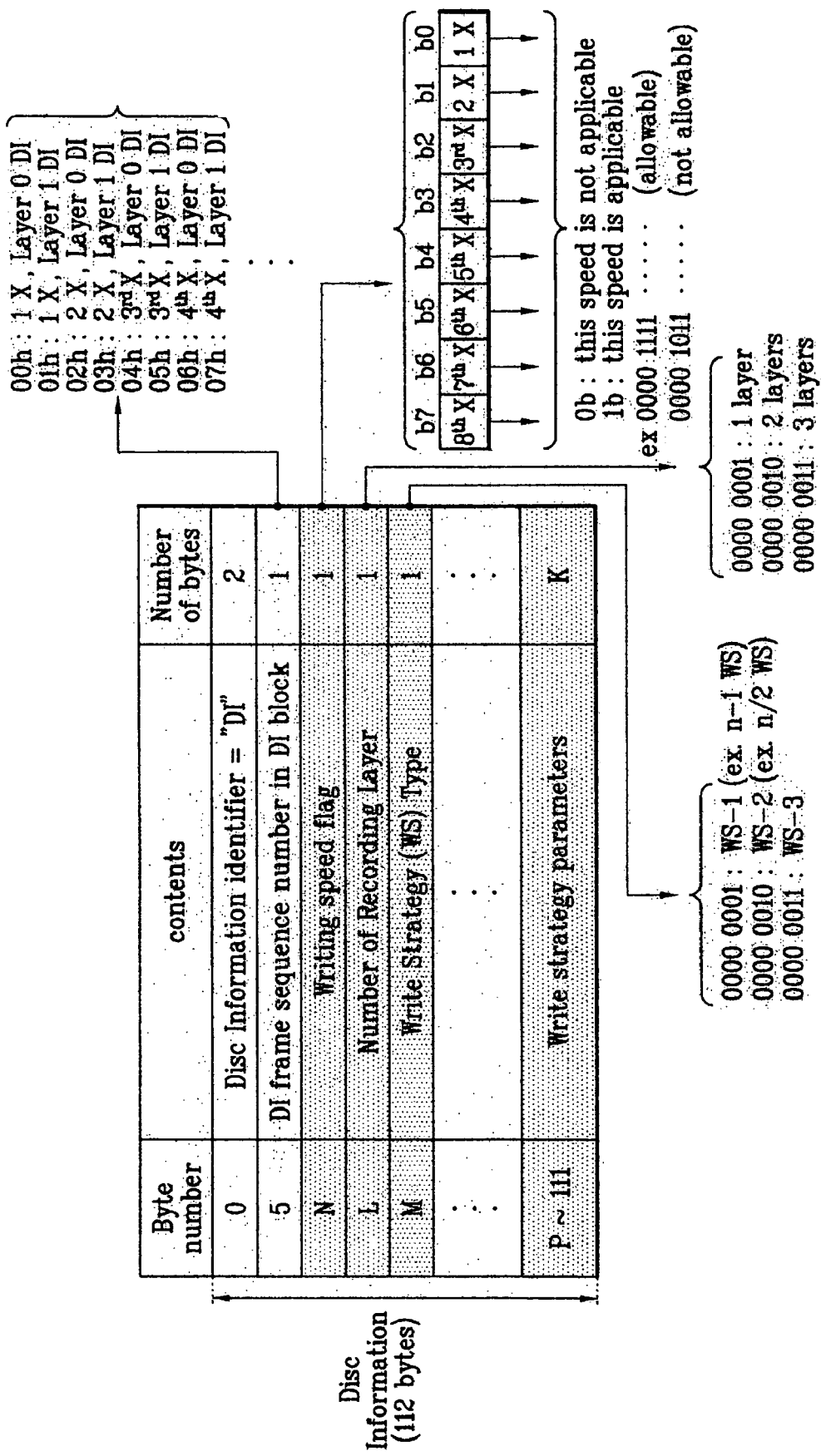

FIG. 7A shows a schematic structure of disc information for explaining a method of recording disc information according to a third embodiment of the present invention.

Referring to FIG. 7A, a sequence for disc information each is decided by a sequence number and is recorded by 1-byte. For instance, the information is recorded in $5^{th}$ byte within disc information, is named 'DI frame sequence number in DI block' field, and is briefly represented by '00h, 01h, 02h, ...'.

Namely, if the information of the $5^{th}$ byte is '00h', it means $1^{st}$ disc information. If the information of the $5^{th}$ byte is '07h', it means $8^{th}$ disc information. A meaning of the sequence of the $5^{th}$ byte will be decided by $N^{th}$ and $L^{th}$ bytes that will be explained later.

Writing speed information applicable by a corresponding disc is recorded in a specific area ($N^{th}$ byte) within disc information which is named 'Writing speed flag' field. For instance, whether a specific writing speed of eight kinds of writing speeds is applicable by the corresponding disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating presence or non-presence of applicability of a specific writing speed.

For instance, if 1× speed is applicable by a corresponding disc only, '0000 0001' is written in $N^{th}$ byte. If all of the eight kinds of writing speeds are applicable, '1111 1111' is written in the $N^{th}$ byte.

In the above explanation, 1× and 2× speeds utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}×$, $4^{th}×$, $5^{th}×$, $6^{th}×$, $7^{th}×$, $8^{th}×$) to 5×, 6×, 8×, 12×, 14×, and 16× speeds, respectively.

Hence, if the corresponding disc allows the writing speeds up to the $4^{th}$ writing speed, it will be written as 'Writing speed flag=0000 1111b'. Yet, if the corresponding disc allows not the $3^{rd}$ writing speed but the $4^{th}$ writing speed, 'Writing speed flag=0000 1011b' is not allowed. Namely, in the 'Writing speed flag' field, if upper bits are set to '1b', the corresponding lower bits should be set to '1b'. Hence, it means that lower bits are not set to '0b' despite '1b' of upper bits.

Meanwhile, recording layer information indicating the number of recording layer(s) existing within the corresponding disc is recorded in another specific area ($L^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer in FIG. 1, '0000 0001' is written in the $L^{th}$ byte. In case that the recording layer is the dual layer in FIG. 2, '0000 0010' is written in the $L^{th}$ byte. In case that four recording layers exist, '0000 0100' is written in the $L^{th}$ byte.

Since limitation is put on the number of the currently considered recording layer(s), which is currently two recording layers, 4-bits within the $L^{th}$ byte are enough to represent total fifteen recording layers (in case of '1111'). In such a case, it is apparent that other valid information can be written in the rest area (4-bits) of the $L^{th}$ byte.

Moreover, identification information for identifying a kind of write strategy (WS) recorded in $P^{th}$~$111^{th}$ bytes is written in another specific area ($M^{th}$ byte) within the disc information, which is named 'Write Strategy (WS) Type' field.

Namely, in the disc information of the present invention, one write strategy (WS) is recorded for a specific writing speed and a specific recording layer and the write strategy is optionally selected from various kinds of specified write strategy types by a disc manufacturer. Hence, if the corresponding disc information is a first type write strategy WS-1, '0000 0001' is written in the $M^{th}$ byte. If the corresponding disc information is a second type write strategy WS-2, '0000 0010' is written in the $M^{th}$ byte. And, substantial write strategy (WS) is recorded in $P^{th}$~$111^{th}$ bytes. Yet, the substantial write strategy (WS) will be recoded as a value interoperating with the decided write strategy (WS) type in the $M^{th}$ byte. The write strategy (WS) type via the $M^{th}$ byte is optionally recordable in every disc information. And, it is also possible to apply one specified write strategy (WS) type in 1× speed disc information, which is expected to be supported by every record playback apparatus (FIG. 8), in a mandatory manner.

And, the write strategy (WS) can be recorded in various ways. As a disc becomes highly densified and has higher speed, a writing speed, i.e., disc RPM) as well as medium properties of recording layer is considerably affected. Hence, a more accurate system is requested. And, the various write strategies (WS) are explained as follows for example.

First of all, there is a system having a write pulse smaller by '1' than a recording mark size (n) formed on a recording layer medium, which may be called '(n−1) WS'. Secondly, there is a system having a write pulse having a size amounting to a half of the recording mark size (n), which may be called 'n/2 WS'. Besides, new write strategies (WS) keep being developed. Regarding the different kinds or types of write strategies (WS), when there exist the various write strategy (WS) types exist as parameters applied to the write strategies (WS) differ from each other, a disc manufacturer tests write power according to the write strategy (WS) recorded in the selected $M^{th}$ byte and then records a result of the test as write strategy (WS) in the $P^{th}$~$111^{th}$ bytes within the disc information.

From the above-recorded 'writing speed information' of the $N^{th}$ byte and the 'recording layer information' of the $L^{th}$ byte, the record playback apparatus (FIG. 8) recognizes how many disc information exist within the corresponding disc. Namely, the number of the existing disc information is found by multiplying an applicable writing speed number by the number of recording layers. As the present invention applies one write strategy (WS) for a specific writing speed and a specific recording layer, the type and number of the write strategy (WS) may not be taken into consideration in deciding the number of disc information.

The above-decided information about the number of total disc information can be recorded in a specific area (e.g., $4^{th}$ byte or the like) (not shown in the drawing) within the disc information as well.

Hence, it is able to program a plurality of the above-decided disc information such that the sequence (which is written in the $5^{th}$ byte as mentioned in the foregoing description) of the disc information is decided by the sequence numbers and such that each of the disc information designates the previously decided writing speed and recording layer by the sequence.

For example, by knowing that four writing speeds applicable by a disc exist if the $N^{th}$ byte is '0000 1111', and that two recording layers exist within the disc if the $L^{th}$ byte is '0000 0010', total eight disc information are needed so that the sequence will be '00h~07h'. And, it is previously decided that disc information of '00h', '01h', '02h', '03h', '04h', '05h', '06h', and '07h' relate to '1× speed, $1^{st}$ recording layer', '2× speed, $2^{nd}$ recording layer', '2× speed, 1st recording layer', '2× speed, $2^{nd}$ recording layer', '$3^{rd}$ writing speed, $1^{st}$ recording layer', '$3^{rd}$ writing speed, $2^{nd}$ recording layer', '$4^{th}$ writing speed, 1st recording layer', and '$4^{th}$ writing speed, $2^{nd}$ recording layer', respectively.

In the above-explained example, the writing speed is preferentially taken into consideration. Yet, it is apparent that the recording layer can be preferentially taken into consideration.

Hence, in order to acquire the disc information for a specific target writing speed and a specific target recording layer, the record playback apparatus (FIG. 8) is facilitated to check which disc information is related to the specific target writing speed and recording layer from 'writing speed information' of the $N^{th}$ byte and 'recording layer information' of the $L^{th}$ byte commonly recorded within the respective disc information instead of playing back to check the entire disc information.

Figure 7B:
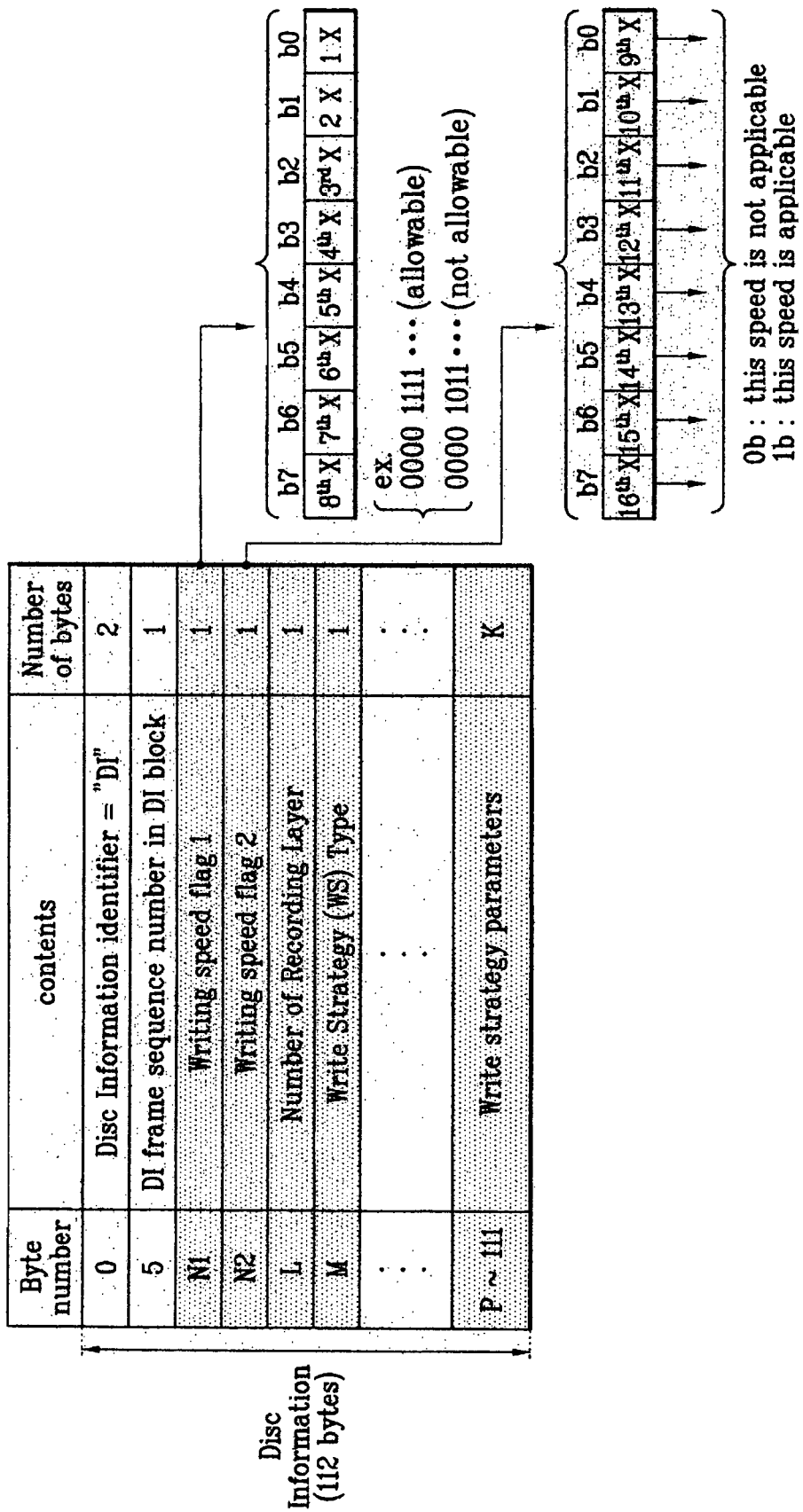

FIG. 7B shows an example of extending the third embodiment of the present invention in FIG. 7A. In case that writing speeds applicable by a disc exceed eight kinds, the $N^{th}$ byte ('Writing speed flag' field) in FIG. 7A is extended to indicate presence or non-presence of applicability of $1^{st}$~$8^{th}$ writing speeds by a flag in $N1^{th}$ byte ('Writing speed flag1' field), and another byte is allocated to display presence or non-presence of applicability of $9^{th}$~$16^{th}$ writing speeds by a flag in $N2^{th}$ byte. Contents written in the rest bytes are equivalent to those of the third embodiment of the present invention in FIG. 7A, thereby being skipped in the following description.

Figure 7C:
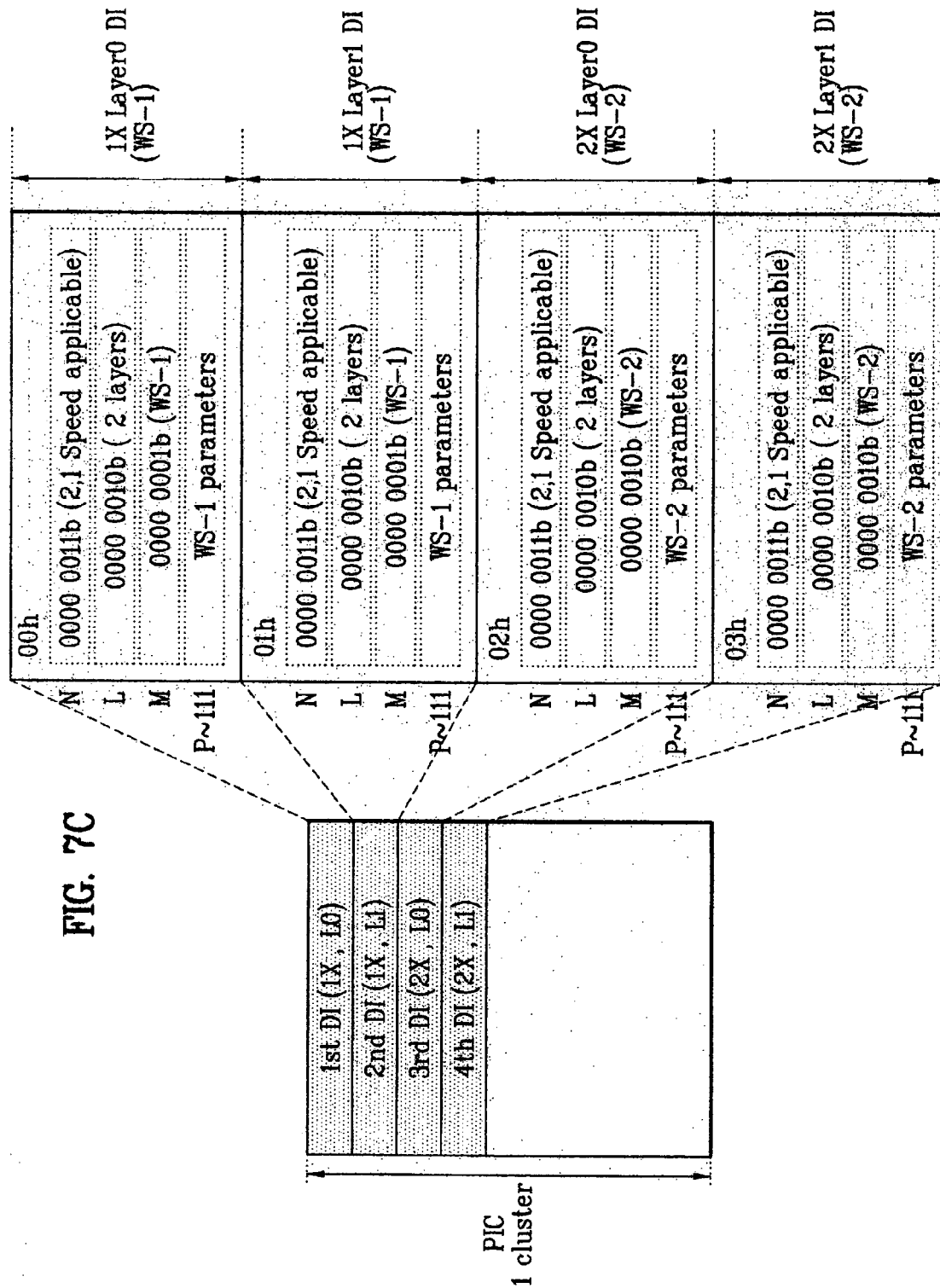

FIG. 7C shows an example of recording disc information by the third embodiment of the present invention in FIG. 7A. It can be known that there are two (1×, 2×) applicable writing speeds from $N^{th}$ byte ('0000 0010b') commonly recorded in the entire disc information and that two recording layers exist within a disc from $L^{th}$ byte ('0000 0010b').

Hence, in the example of FIG. 7C, total four disc information (two recording layers*two writing speeds) exist and a sequence of the disc information becomes '00h' (1×, L0)→'01h' (1×, L1)→'02h' (2×, L0)→'03h' (2×, L1). This is a specified content according to a predetermined sequence and, as mentioned in the foregoing description, can be rendered into a different sequence by a specification.

An intrinsic write strategy (WS) is recorded in other bytes within each disc information as well as in $N^{th}$ and $L^{th}$ bytes. Specifically, information of a type of write strategy (WS) written in $P^{th}$~$111^{th}$ bytes within the corresponding disc information is recorded in $M^{th}$ byte. Namely, information written in the $M^{th}$ byte and the $P^{th}$~$111^{th}$ bytes can differ in each disc information.

In the example in FIG. 7C, '00h' (1×, L0) and '01h' (1×, L1) relate to the application of a first type write strategy (WS-1) and '02h' (2×, L0) and '03h' (2×, L1) relate to the application of a second type write strategy (WS-2).

FIG. 7D shows another example of recording disc information according to the third embodiment of the present invention in FIG. 7A. It can be known that there are eight (1×, 2×, ..., 16×) applicable writing speeds from $N^{th}$ byte ('1111 1111b') commonly recorded in the entire disc information and that four recording layers exist within a disc from $L^{th}$ byte ('0000 0100b'). Hence, in the another example of FIG. 7D, total thirty-two disc information (four recording layers*eight writing speeds) exist and a sequence of the disc information becomes '00h' (1×, L0)→'01h' (1×, L1)→'02h' (1×, L2)→'03h' (1×, L4)→'04h' (2×, L0)→ ... →'31h' (16×, L4)

An intrinsic write strategy (WS) is recorded in other bytes within each disc information as well as in Nth and $L^{th}$ bytes. Specifically, information of a type of a write strategy (WS) written in $P^{th}$~$111^{th}$ bytes within the corresponding disc information is recorded in $M^{th}$ byte. Namely, information written in the $M^{th}$ byte and the $P^{th}$~$111^{th}$ bytes can differ in each disc information.

In the another example of FIG. 7D, if a record playback unit (FIG. 8) intends to search disc information related to 2×speed (2×, L0) of a first recording layer to perform a recording by applying a write strategy (WS) within the corresponding disc information, it can be known from the information in the $N^{th}$ and $L^{th}$ bytes commonly recorded in the entire disc information that total thirty-two disc information (four recording layers*eight writing speeds) exist in the corresponding disc according to the sequence of the disc information such as '00h' (1×, L0)→'01h' (1×, L1)→'02h' (1×, L2)→'03h' (1×, L4)→'04h' (2×, L0)→ ... →'31h' (16×, L4).

Hence, the record playback apparatus (FIG. 8) enables to recognize that the disc information related to the 2× speed (2×, L0) of the first recording layer to be searched is '04h' and that the corresponding disc information ('04h') is recorded as the first type write strategy (WS-1_ from the write strategy (WS) type identification information ('0000 0002b') recorded in the $M^{th}$ byte within the corresponding information ('04h'), thereby reading out parameter values of the first type write strategy (WS-1) via the $P^{th}$~$111^{th}$ bytes to utilize in the recording.

Likewise, if intending to search disc information related to 16×speed (16×, L3) of a fourth recording layer to perform recording by applying a write strategy (WS) within the corresponding disc information, the record playback unit (FIG. 8) recognizes that the corresponding disc information is '31h' via the same process and that the write strategy type (WS) is the second type (WS-2), thereby enabling to utilize them in the recording.

Therefore, if a host or a control unit ('20' in FIG. 8) intends to perform a recording on a specific recording layer at a specific writing speed, the record playback apparatus (FIG. 8) is facilitated to search the corresponding disc information, thereby enabling to confirm the write strategy (WS) recorded within the corresponding disc information.

For reference, the information of the first and third embodiments can be recorded within the disc information (DI) together or within separate disc control information (not shown in the drawing), respectively. In this case, the applicable speed information disclosed in the third embodiment may have a priority. This is to decide by the information disclosed in the third embodiment whether a corresponding specific writing speed is applicable because a portion of maximum writing speed, minimum writing speed, nominal writing speed, and other writing speed information may not be substantially applicable.

Figure 8:
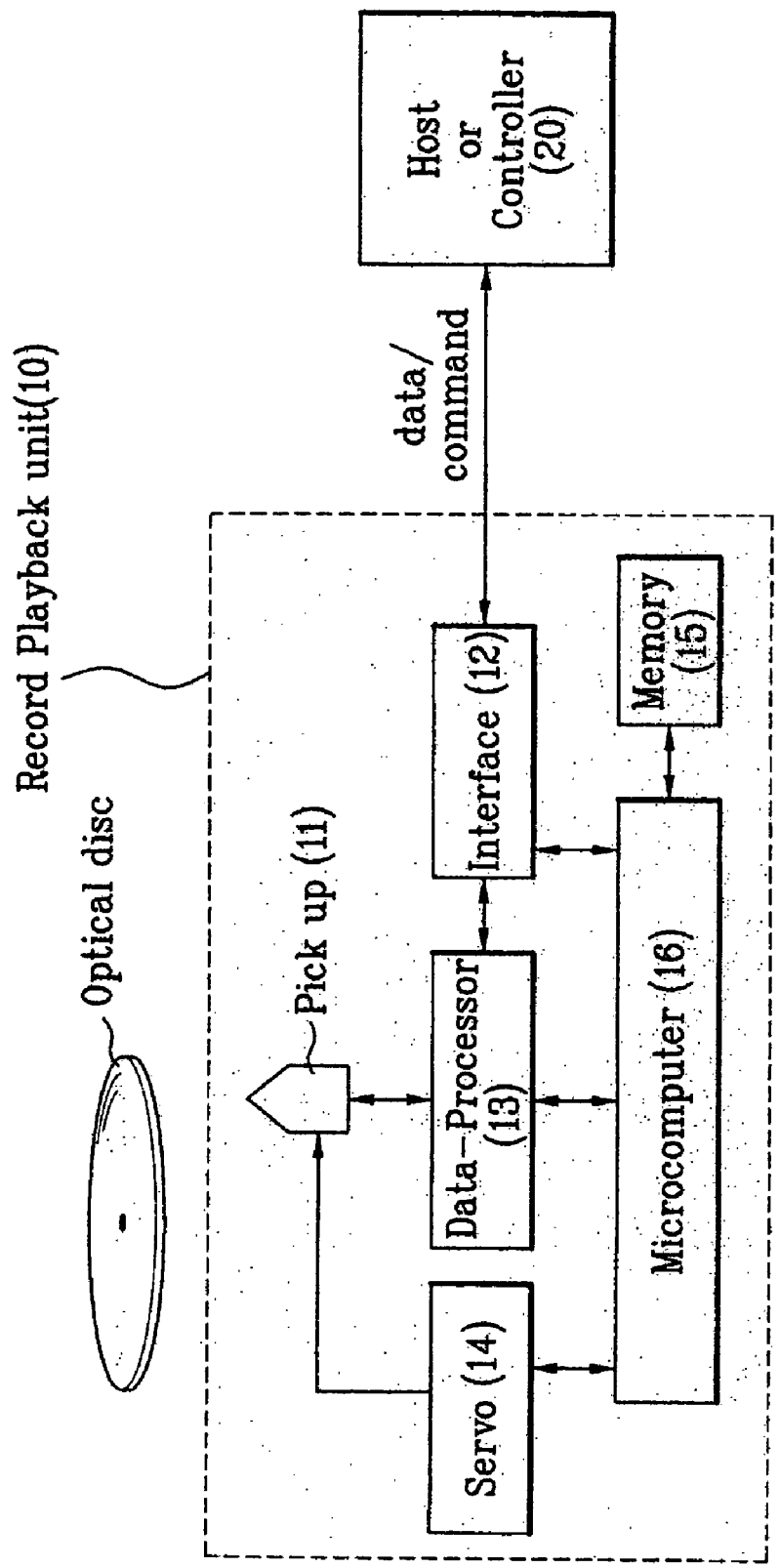
FIG. 8 is a block diagram of an optical disc recording and reproducing apparatus using disc control information according to the present invention.

FIG. 8 illustrates an optical disc recording and reproducing apparatus using disc control information according to the present invention. The recording and reproducing apparatus comprises a record/playback unit 10 for recording data on and reproducing data from an optical disc and a controller 20 for controlling the record/playback unit 10. The controller 20 generates a record or playback command for a specific area, and the record/playback unit 10 caries out the record/playback function for the specific area accordingly. The record/playback unit 10 includes an interface 12 for communicating with an external device, i.e., the controller (or host); a pickup 11 for performing read and write operations with respect to the optical disc; a data processor 13 for modulating the pickup's input signal for performing a recording operation and for demodulating the pickup's output signal for performing a reproduction operation; a servo 14 for controlling the read and write operations of the pickup; a memory 15 for temporarily storing disc control information and user data to be recorded or read; and a microcomputer 16 for respectively controlling each element of the record/playback unit.

In the above system, it is also possible to control the recording and/or reproducing of data without the control unit 20. In that case, the Microcomputer 16 may control all units in the record/playback unit 10 as performing the function of the control unit 10.

In a recording data on an optical disc according to the present invention, the optical disc recording and reproducing apparatus first reads the entire disc management area of an inserted optical disc, the read information being disc information of the present invention, which is temporarily stored in the memory 15. Thus, the recording layer information, recording velocity information, and write strategy fitting the corresponding recording velocity are read out and temporarily stored.

If intending to perform a writing on a specific area within the optical disc, the controller 20 renders such an intent into a writing command and then delivers it to the record/playback unit 10 together with data for writing location information to be recorded. After receiving the writing command, the microcomputer 16 decides the corresponding recording velocity applied to an intended recording layer within the optical disc from the management information stored in the memory 15 and then performs the writing command using the most optimal write strategy by referring to the determined recording velocity.

Specifically, in case that the recording is performed on the optical disc by the first embodiment of the present invention, the microcomputer 16 performs the recording in a manner of applying a different per writing speed write strategy (WS) to each area within the disc by considering the maximum, intermediate, minimum, and other writing speeds.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computer-readable medium storing a data structure having recording speed information, the recording speed information comprising:

a first information used to indicate a recording speed as a maximum recording speed;

a second information used to indicate a recording speed as a minimum recording speed;

a third information used to indicate a recording speed as a predetermined recording speed different from the maximum and minimum recording speeds;

a fourth information used to indicate a recording speed as a basic recording speed; and applicable recording speed information indicating whether a specific recording speed is applicable to a recording medium or not, wherein at least one basic recording speed indicated by the fourth information has to be supported by a recording medium, wherein the applicable recording speed information indicates the each applicable recording speed in a bit position, and wherein the applicable recording speed information is configured in a manner that a bit for higher recording speed is set to indicate that a higher applicable recording speed is one of applicable and inapplicable if a bit for lower recording speed is set to indicate that a lower applicable recording speed is applicable, and the bit for the higher recording speed is set to indicate only that the higher applicable recording speed is inapplicable if the bit for lower recording speed is set to indicate that the lower applicable recording speed is inapplicable.

2. The computer-readable medium storing the data structure of claim 1, further comprising a plurality of recording speed parameters to be used or used to record data by the respective recording speeds.

3. The computer-readable medium storing the data structure of claim 2, wherein each recording speed parameter includes write power and pulse timing information for recording data on the recording medium.

4. The computer-readable medium storing the data structure of claim 3, wherein at least one of the maximum, minimum and predetermined recording speed is the at least one basic recording speed.

5. The computer-readable medium storing the data structure of claim 4, wherein the fourth information is used to indicate at least two basic recording speeds.

6. The computer-readable medium storing the data structure of claim 1, wherein the applicable recording speed information has a priority to determine an applicability of specific recording speed over the recording speed information.

7. The computer-readable medium storing the data structure of claim 1, further comprising:
write strategy parameters for a recording speed being applicable to a recording medium.

8. A method of recording a recording speed information on an optical recording medium, comprising:
generating recording speed information, the recording speed information includes a first information used to indicate a recording speed as a maximum recording speed, a second information used to indicate a recording speed as a minimum recording speed, a third information used to indicate a recording speed as a predetermined recording speed different from the maximum or minimum recording speed, and a fourth information used to indicate a recording speed as a basic recording speed, wherein at least one basic recording speed indicated by the fourth information has to be supported by the optical recording medium;
recording the recording speed information on a specific area of the optical recording medium; and
recording a recordable speed information indicating whether specific recording speed is applicable to the recording medium, the recordable speed information indicates a recording speed in a bit position, and
wherein the recording step records the recordable speed information in a manner that a bit for higher recording speed is set to indicate that the higher recording speed is applicable or indicate that the higher recording speed is not applicable if a bit for lower recording speed is set to indicate that the lower recording speed is applicable, and the bit for the higher recording speed is set to indicate only that the higher recording speed is not applicable if the bit for lower recording speed is set to indicate that the lower recording speed is not applicable.

9. The method of claim 8, further comprising:
recording write strategy parameters for a corresponding recording speed being applicable to the optical recording medium.

10. The method of claim 8, further comprising:
recording a plurality of recording speed parameters to be used to record data by the respective recording speeds, wherein the recording speed parameter includes write power and pulse timing information for recording data one the optical recording medium.

11. The method of claim 8, wherein the recordable speed information has a priority to determine an applicability of specific recording speed over the recording speed information.

12. A computer-readable medium storing a data structure having recording speed information, the recording speed information comprising:
a first information used to indicate a recording speed as a maximum recording speed, a second information used to indicate a recording speed as a minimum recording speed, a third information used to indicate a recording speed as a predetermined recording speed different from the maximum and minimum recording speeds, and a fourth information used to indicate a recording speed as a basic recording speed; and
an applicable recording speed information indicating whether specific recording speed is applicable,
wherein at least one basic recording speed indicated by the fourth information has to be supported by a recording medium,
wherein the applicable recording speed information indicates applicability of each recording speed in a bit position, and
wherein the applicable recording speed information is configured in a manner that a first recording speed flag for higher recording speed is set to indicate one of available and unavailable status if a second recording speed flag for lower recording speed is available status while the first recording speed flag is only set to indicate unavailable status if the second recording speed flag is unavailable status.

13. The computer-readable medium of claim 12, further comprising:
a plurality of recording speed parameters to be used to record data by the respective recording speeds.

14. The computer-readable medium of claim 13, wherein each recording speed parameter includes write power and pulse timing information for recording data on the computer-readable medium.

15. The computer-readable medium of claim 14, wherein at least one of the first, second and third information is the at least one basic recording speed.

16. The computer-readable medium of claim 12, wherein the fourth information is used to indicate at least two basic recording speeds.

17. The computer-readable medium of claim 12, further comprising:
write strategy parameters for a recording speed being applicable to the computer-readable medium, the write strategy parameter including write power and pulse timing information for recording data on the computer-readable medium.

18. An optical disc comprising:
at least one recording layer provided with a recordable area and a prerecorded area including disc control information, the disc control Information is separately recorded within the prerecorded area per recording layer and a plurality of recording speed information and a plurality of write strategies associated with corresponding recording speeds are recorded within the disc control information, and the plurality of recording speed information includes a basic recording speed information, a maximum recording speed information, a minimum recording speed information and at least one intermediate recording speed information indicating an intermediate recording speed between the maximum and minimum recording speeds applicable to the optical disc, wherein at least one basic recording speed included in the basic recording speed information has to be supported by the optical disc and at least one of the maximum, minimum and intermediate recording speed is the at least one basic recording speed, and wherein the applicable recording speed information is configured in a manner that a bit for higher recording speed is set to indicate that a higher applicable recording speed is one of applicable and inapplicable if a bit for lower recording speed is set to indicate that a lower applicable recording speed is applicable, and the bit for the higher recording speed is set to indicate only that the higher applicable recording speed is inapplicable if the bit for lower recording speed is set to indicate that the lower applicable recording speed is inapplicable.

19. The optical disc of claim 18, wherein the optical disc is a recordable DVD.

20. An apparatus for recording control information of recording medium, comprising:

a pickup unit configured to read or record the control information including a plurality of recording speed information and at least one write strategy information associated with a specific recording speed, the plurality of recording speed information includes basic recording speed information, maximum recording speed information, minimum recording speed information and at least one intermediate recording speed information indicating an intermediate recording speed between the maximum and minimum recording speeds applicable to the recording medium, wherein at least one basic recording speed included in the basic recording speed information has to be supported by the recording medium;

a servo unit, operatively coupled to the pickup unit, configured to control a servo operation of the pickup unit according to the specific recording speed;

a storage unit configured to store the control information read from the pickup unit; and a controller, operatively coupled to the pickup unit, the servo unit and the storage unit, configured to control the pickup unit to record the control information on a specific area of the recording medium, wherein the control information further includes recordable speed flags indicating whether a recording speed is applicable to the recording medium, the recordable speed flags being set in a manner that a first recordable speed flag for higher recording speed is set to indicate that the higher recording speed is available or unavailable if a second recordable speed flag for lower recording speed is set to indicate that the lower recording speed is available, while the first recordable speed flag is only set to indicate that the higher recording speed is unavailable if the second recordable speed flag is set to indicate that the lower recording speed is unavailable, and wherein the controller is configured to control the pickup unit to read or write the control information according to the recordable speed flags prior to the recording speed fields.

21. The apparatus of claim 20, wherein the write strategy information includes a corresponding write power and pulse timing for the specific recording speed and the controller is configured to control the pickup unit to record data based on a corresponding write power and pulse timing at the specific recording speed.

22. The apparatus of claim 21, wherein the controller is configured to control the recording operation of the data by the pickup unit referring to the write strategy information read from the recording medium at the specific recording speed.

23. The apparatus of claim 21, wherein the controller is configured to control the recording operation of the data by the pickup unit referring to the write strategy information read from the storage unit at the specific recording speed.

24. The apparatus of claim 20, wherein at least one of the maximum, minimum and intermediate recording speeds is the at least one basic recording speed and the controller is configured to control the pickup unit to record the control information on the specific area of the recording medium.

25. An apparatus for recording data on a recording medium, comprising:

an optical pickup configured to read or write recording speed information from or on the recording medium, the recording speed information including first information used to indicate a recording speed as a maximum recording speed, second information used to indicate a recording speed as a minimum recording speed, third information used to indicate a recording speed as a predetermined recording speed different from the maximum or minimum recording speed and fourth information used to indicate a recording speed as a basic recording speed, wherein at least one basic recording speed indicated by the fourth information has to be supported by the recording medium;

a servo unit, operatively coupled to the optical pickup, configured to control a servo operation of the optical pickup according to a specific recording speed;

a memory configured to store the recording speed information read from the optical pickup;

a controller, operatively coupled to the optical pickup, the servo unit and the memory, configured to control the optical pickup to read or write the recording speed information from or on a specific area of the recording medium and control the memory to store the recording speed information; and wherein the optical pickup is configured to further read or record a recordable speed information indicating whether a specific recording speed is applicable to the recording medium, the recordable speed information indicates a recording speed in a bit position and the controller is configured to control the optical pickup to record the data on the recording medium according to the recordable speed information prior to the recording speed information, and wherein the recordable speed information is configured in a manner that a recordable speed flag for higher recording speed depends on a recordable speed flag for lower recording speed and the recordable speed flag for higher recording speed is set to indicate one of available and unavailable status if the recordable speed flag for lower recording speed is available while the recordable speed flag for higher recording speed is only set to indicate unavailable status if the recordable speed flag for lower recording speed is unavailable, wherein the controller is configured to control the optical pickup to record the data on the recording medium based on the recordable speed flag.

26. The apparatus of claim 25, wherein the optical pickup is configured to further read or record write strategy parameters for a corresponding recording speed being applicable to the recording medium and the controller is configured to utilize the write strategy parameters during recording data.

27. The apparatus of claim 26, wherein the write strategy parameters include write power and pulse timing information for the corresponding recording speed and the controller is configured to utilize the corresponding write power and pulse timing information at the specific recording speed during recording data.

28. The apparatus of claim 25, wherein the optical pickup is configured to further read or record a plurality of recording speed parameters to be used to record data by the respective recording speeds and controller is configured to utilize the recording speed parameters during recording data.

29. The apparatus of claim 25, wherein at least one of the maximum, minimum and predetermined recording speeds is the at least one basic recording speed and the controller is configured to control the optical pickup to read or write the recording speed information from or on the specific area of the recording medium.

30. An apparatus for recording control information on a recording medium, comprising:
a storage unit configured to store control information, the control information including recording speed fields including a first recording speed field indicating a maximum recording speed, a second recording speed field indicating a minimum recording speed, a third recording speed field indicating a predetermined recording speed different from the maximum and minimum recording speeds and a fourth recording speed field indicating a basic recording speed, wherein the basic recording speed is a recording speed that must be supported by the recoding medium;
a pickup unit configured to read or write the control information from or on the recording medium;
a servo unit, operatively linked to the pickup unit, configured to control a servo operation of the pickup unit according to a recording speed; and
a control unit, operatively linked to the storage unit, the pickup unit and the servo unit, configured to control the pickup unit to read or write the control information and the storage unit to store the control information,
wherein the control information further includes recordable speed flags indicating whether a recording speed is applicable to the recording medium, the recordable speed flags being set in a manner that a first recordable speed flag for higher recording speed is set to indicate that the higher recording speed is available or unavailable if a second recordable speed flag for lower recording speed is set to indicate that the lower recording speed is available, while the first recordable speed flag is only set to indicate that the higher recording speed is unavailable if the second recordable speed flag is set to indicate that the lower recording speed is unavailable, and
wherein the control unit is configured to control the pickup unit to read or write the control information according to the recordable speed flags prior to the recording speed fields.

31. The apparatus of claim 30, wherein the pickup unit is configured to further read or record write strategy information and the control unit is configured to control the pickup unit to record data based on the write strategy information.

32. The apparatus of claim 31, wherein the control unit is configured to further control the pickup unit to record the data on the recording medium at a specific recording speed according to write strategy information corresponding to the specific recording speed.

33. The apparatus of claim 32, wherein the write strategy information includes write power and pulse timing for the corresponding specific recording speed and the control unit is configured to control the pickup unit to record data on the recording medium using the write power and pulse timing at the specific recording speed.

34. The apparatus of claim 33, wherein at least one of the maximum, minimum and predetermined recording speeds is the basic recording speed and the control unit is configured to control the pickup unit to read or write the control information.

35. The method of claim 8, wherein at least one of the maximum, minimum and predetermined recording speed is the at least one basic recording speed.

* * * * *